United States Patent
Ueberreiter et al.

(10) Patent No.: US 9,817,940 B2
(45) Date of Patent: Nov. 14, 2017

(54) METHOD WHEREIN TEST CELLS AND DUMMY CELLS ARE INCLUDED INTO A LAYOUT OF AN INTEGRATED CIRCUIT

(71) Applicant: GLOBALFOUNDRIES Inc., Grand Cayman (KY)

(72) Inventors: Guido Ueberreiter, Dresden (DE); Paul Ackmann, Ganesvoort, NY (US); Guoxiang Ning, Ballston Lake, NY (US); Jui-Hsuan Feng, Ballston Lake, NY (US); Chin Teong Lim, Clifton Park, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 15/585,972

(22) Filed: May 3, 2017

(65) Prior Publication Data

US 2017/0235866 A1    Aug. 17, 2017

Related U.S. Application Data

(62) Division of application No. 14/703,179, filed on May 4, 2015, now Pat. No. 9,672,312.

(51) Int. Cl.
*G06F 17/50* (2006.01)

(52) U.S. Cl.
CPC ...... *G06F 17/5072* (2013.01); *G06F 17/5081* (2013.01); *G06F 2217/06* (2013.01); *G06F 2217/12* (2013.01)

(58) Field of Classification Search
CPC .................................................. G06F 17/5072
USPC ........................................................ 716/55
See application file for complete search history.

(56) References Cited

U.S. PATENT DOCUMENTS

| | | | | |
|---|---|---|---|---|
| 7,509,622 | B2 * | 3/2009 | Sinha | G06F 17/5068 700/119 |
| 8,539,416 | B1 * | 9/2013 | Rossman | G06F 17/5081 716/118 |
| 2003/0229875 | A1 * | 12/2003 | Smith | G06F 17/5068 716/111 |
| 2009/0319968 | A1 * | 12/2009 | Wang | G06F 17/5068 716/106 |
| 2015/0363532 | A1 | 12/2015 | Bashaboina et al. | |

* cited by examiner

*Primary Examiner* — Suresh Memula
(74) *Attorney, Agent, or Firm* — Amerson Law Firm, PLLC

(57) ABSTRACT

A method includes receiving a layout of an integrated circuit that includes a plurality of layers, one of the layers is selected and one or more tile number values are provided. A die area of the integrated circuit is partitioned into a plurality of tiles on the basis of the tile number values. It is determined, on the basis of the layout, if a portion of the selected one of the layers in the tile has an available space for inclusion of a test cell or a dummy cell, and a label indicative of a result is assigned to the tile. It is determined, on the basis of the labels assigned, if one or more space availability criteria are fulfilled and, if fulfilled, the labels are used for placing at least one of one or more test cells and one or more dummy cells in the layout.

16 Claims, 14 Drawing Sheets

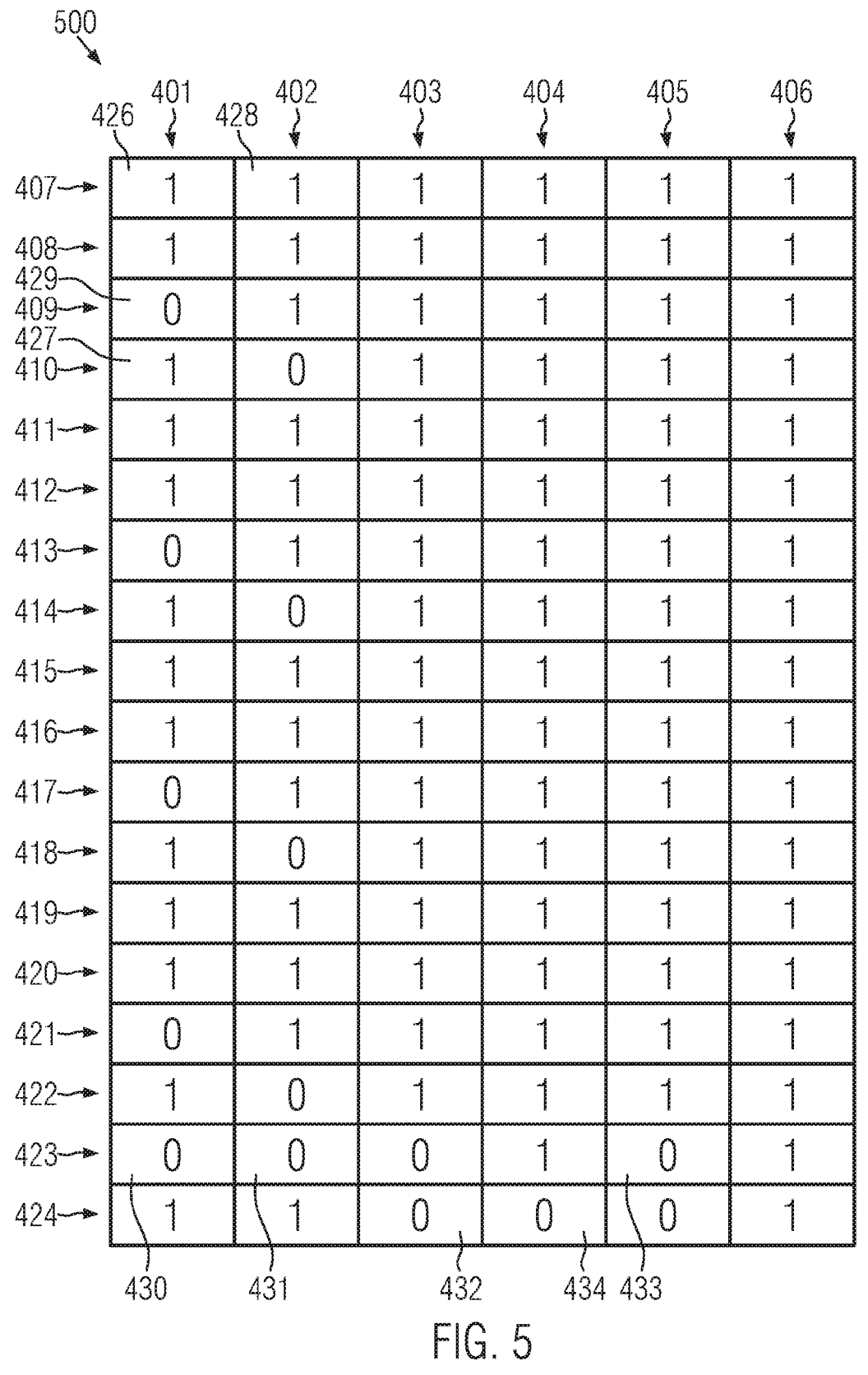

|     | 401 | 402 | 403 | 404 | 405 | 406 |
|-----|-----|-----|-----|-----|-----|-----|
| 407 | 1 | 1 | 1 | 1 | 1 | 1 |
| 408 | 1 | 1 | 1 | 1 | 1 | 1 |
| 409 | 0 | 1 | 1 | 1 | 1 | 1 |
| 410 | 1 | 0 | 1 | 1 | 1 | 1 |
| 411 | 1 | 1 | 1 | 1 | 1 | 1 |
| 412 | 1 | 1 | 1 | 1 | 1 | 1 |
| 413 | 0 | 1 | 1 | 1 | 1 | 1 |
| 414 | 1 | 0 | 1 | 1 | 1 | 1 |
| 415 | 1 | 1 | 1 | 1 | 1 | 1 |
| 416 | 1 | 1 | 1 | 1 | 1 | 1 |
| 417 | 0 | 1 | 1 | 1 | 1 | 1 |
| 418 | 1 | 0 | 1 | 1 | 1 | 1 |
| 419 | 1 | 1 | 1 | 1 | 1 | 1 |
| 420 | 1 | 1 | 1 | 1 | 1 | 1 |
| 421 | 0 | 1 | 1 | 1 | 1 | 1 |
| 422 | 1 | 0 | 1 | 1 | 1 | 1 |
| 423 | 0 | 0 | 0 | 1 | 0 | 1 |
| 424 | 1 | 1 | 0 | 0 | 0 | 1 |

FIG. 5

|     | 401 | 402 | 403 | 404 | 405 | 406 |
|-----|-----|-----|-----|-----|-----|-----|
| 407 | A | B | A | B | A | B |
| 408 | A | B | A | B | A | B |
| 409 | 429 | A | B | A | B | A |
| 410 | A |   | B | A | B | A |
| 411 | A | B | A | B | A | B |
| 412 | A | B | A | B | A | B |
| 413 |   | A | B | A | B | A |
| 414 | A |   | B | A | B | A |
| 415 | A | B | A | B | A | B |
| 416 | A | B | A | B | A | B |
| 417 |   | A | B | A | B | A |
| 418 | A |   | B | A | B | A |
| 419 | A | B | A | B | A | B |
| 420 | A | B | A | B | A | B |
| 421 |   | A | B | A | B | A |
| 422 | A |   | B | A | B | A |
| 423 | 430 | 431 |   | B | 433 | A |
| 424 | A | B | 432 | 434 |   | A |

FIG. 6

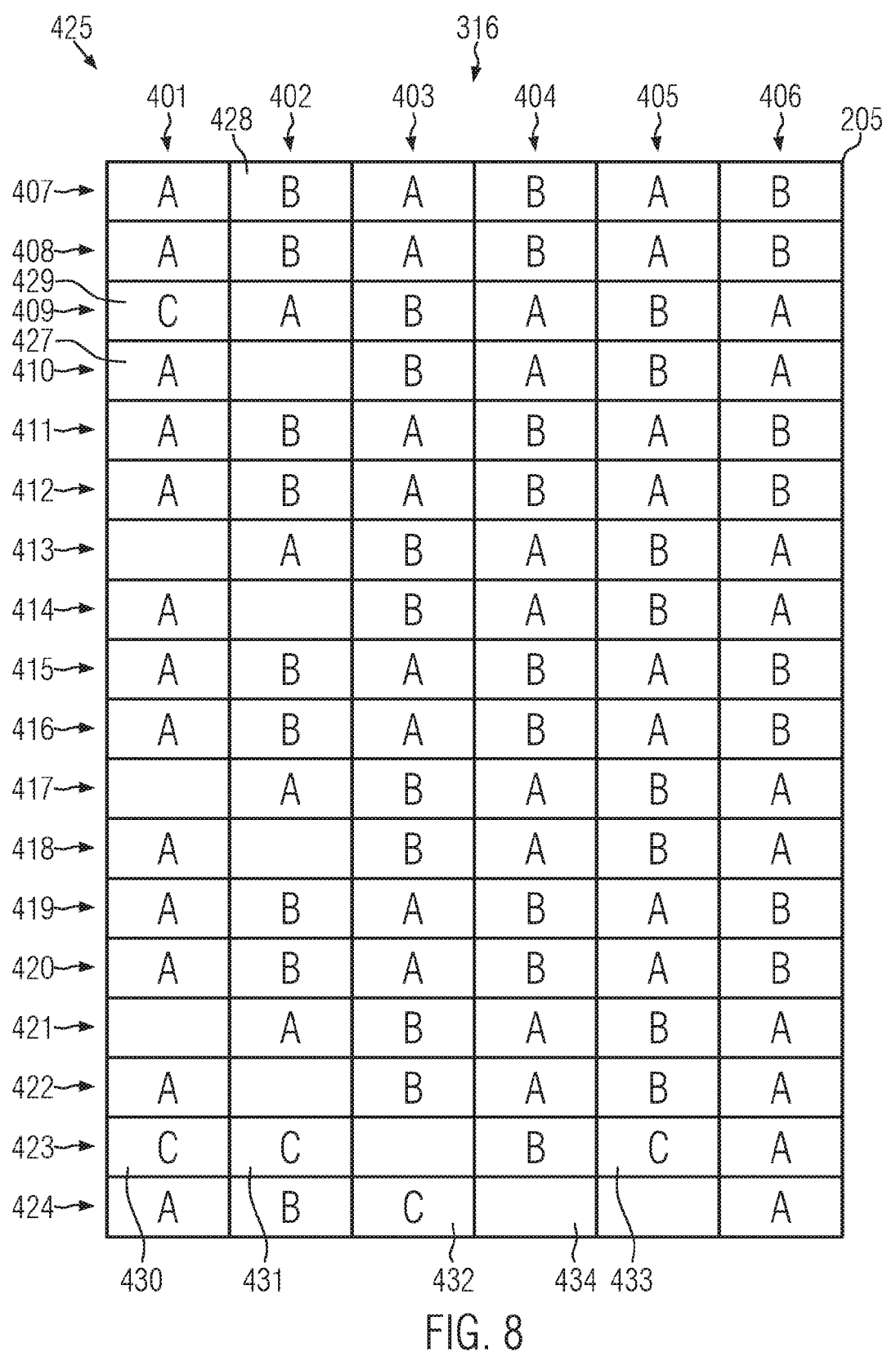

|   | 401 | 402 | 403 | 404 | 405 | 406 |
|---|---|---|---|---|---|---|
| 407 | A | B | A | B | A | B |
| 408 | A | B | A | B | A | B |
| 409 | C | A | B | A | B | A |
| 410 | A |   | B | A | B | A |
| 411 | A | B | A | B | A | B |
| 412 | A | B | A | B | A | B |
| 413 |   | A | B | A | B | A |
| 414 | A |   | B | A | B | A |
| 415 | A | B | A | B | A | B |
| 416 | A | B | A | B | A | B |
| 417 |   | A | B | A | B | A |
| 418 | A |   | B | A | B | A |
| 419 | A | B | A | B | A | B |
| 420 | A | B | A | B | A | B |
| 421 |   | A | B | A | B | A |
| 422 | A |   | B | A | B | A |
| 423 | C | C |   | B | C | A |
| 424 | A | B | C |   |   | A |

FIG. 8

METHOD WHEREIN TEST CELLS AND DUMMY CELLS ARE INCLUDED INTO A LAYOUT OF AN INTEGRATED CIRCUIT

BACKGROUND OF THE INVENTION

1. Field of the Invention

Generally, the present disclosure relates to the manufacturing of integrated circuits and, in particular, to the provision of layouts of integrated circuits including test cells.

2. Description of the Related Art

Integrated circuits typically include a large number of circuit elements which include, in particular, field effect transistors. The circuit elements in an integrated circuit may be electrically connected by means of electrically conductive metal lines formed in a dielectric material, for example, by means of damascene techniques. The electrically conductive metal lines may be provided in a plurality of metal layers that are arranged above each other over a substrate in and on which the circuit elements are formed. Metal lines in different metal layers may be electrically connected with each other by means of contact vias that are filled with metal and are provided in via layers that are arranged between the metal layers. Further electrically conductive features, such as contacts and vias filled with an electrically conductive material, may be provided for providing an electrical connection between the metal lines in the lowest metal layer and the circuit elements.

Due to the complexity of modern integrated circuits, in the design of integrated circuits, techniques of electronic design automation are typically employed. Techniques of electronic design automation may include the creation of a user specification that defines the functionality of the integrated circuit. The user specification may be the basis for the creation of a register transfer level description that models the integrated circuit in terms of a flow of signals between hardware registers and logical operations performed on those signals. The register transfer level description of the integrated circuit may then be used for the physical design of the integrated circuit, wherein a layout of the integrated circuit is created. The layout may include layer layout information for a plurality of layers of the integrated circuit, and it may be used for forming one or more reticles (sometimes also denoted as "photomasks") for each of the layers of the integrated circuit. The reticles may then be employed for patterning materials in the manufacturing of the integrated circuit by means of photolithography processes.

Before the photomasks are manufactured by means of techniques such as electron beam lithography, a processing of the layout may be performed, as described in the following with reference to FIG. 1. At 101, the layout is received. The layout may be received in the form of an artwork file provided by a layout tool, for example, as a GDSII file.

At 102, dummy patterns may be inserted into the layout. Dummy patterns may be inserted into the layout between regions of the layout that include target features for providing functional circuit features of the integrated circuit. Dummy patterns may be included into regions of the integrated circuit wherein there is a relatively small density of functional circuit features. This may help to maintain a density of circuit features in a range that is advantageous with respect to a manufacturability of the integrated circuit.

At 103, a bias may be applied and/or a retargeting of the layout may be performed. In doing so, shapes of target features in the layout that define shapes of features to be formed on a semiconductor wafer in a photolithography process may be amended for improving a manufacturability of the integrated circuit.

At 104, an insertion of sub-resolution assist features (SRAFs) may be performed. SRAFs may be provided on the reticle in addition to printing reticle features which are employed for forming photoresist features of the photoresist mask. SRAFs may be small reticle features which may have a bar shape and which are provided on the reticle in the vicinity of the printing reticle features. When the reticle is used in a photolithography process, typically no photoresist features corresponding to the SRAFs are formed in the photoresist mask. However, the presence of SRAFs may reduce a sensitivity of the photolithography process with respect to variations of parameters of the photolithography process, which may include, in particular, a focus of the projection and a dose of the radiation used for projecting the reticle to the photoresist.

An inclusion of SRAFs may be performed in accordance with rule-based techniques or model-based techniques. In model-based techniques, an optical model that may be used for a simulation of a photolithography process may be provided. The simulation of the photolithography process may include a simulation of the formation of an aerial image by the optical system of the photolithography tool and/or a simulation of the behavior of the photoresist. The simulation may be employed in an optimization process wherein SRAFs are included into the layout.

In rule-based techniques, a set of rules, which are denoted as "recipes," define the inclusion of SRAFs in dependence of patterns of target features in the layout.

At 105, an optical proximity correction (OPC) and an adjustment of SRAFs may be performed. In OPC techniques, shapes of reticle features that are provided on a reticle may be modified compared to shapes of target features that are to be formed in a photoresist mask that is formed from a layer of photoresist on the wafer in the photolithography process. OPC may help to compensate for image errors in the projection of the reticle to the photoresist and/or other process errors.

Techniques for performing OPC include rule-based OPC processes and model-based OPC processes. In rule-based OPC processes, edges of reticle features may be moved relative to edges of target features and/or additional polygons may be added to the reticle features. The movement of edges and/or the addition of polygons may be performed on the basis of a set of rules that is defined by a rule script. The rules may include, for example, an addition of serifs at convex corners of reticle features, a removal of portions of reticle features at concave corners or a modification of a size of reticle features, for example, an increase of a size of reticle features that are provided for forming photoresist features employed in the formation of isolated contact vias.

In model-based OPC techniques, a simulation of a photolithography process may be performed, and a modification of the shapes of the reticle features compared to the shapes of the target features may be performed on the basis of results of the simulation so that a better agreement between the shapes of the photoresist features in the photomask with the shapes of the target features is obtained.

The adjustment of the SRAFs may include an adjustment of sizes of the SRAFs in order to avoid a printing of patterns corresponding to the SRAFs in the photoresist.

At 106, the layout as amended at 102, 103 and 105 may be output for the reticle formation.

For monitoring the performance of processes used for the formation of the reticles, such as electron beam lithography and photolithography processes wherein the reticles are used for patterning a photoresist layer on a wafer, various measurements may be performed, which may include standard measurements of critical dimensions and measurements for long term monitoring of critical dimensions that may be used for wafer critical dimension uniformity (CDU) measurement. Results of wafer CDU measurements may be fed back to a photolithography tool such as, for example, a scanner, for intra-field CDU correction in photolithography processes performed at wafers.

Furthermore, measurements of critical dimensions may be performed for purposes of dose mapping in reticle formation, and for providing critical dimension correction maps for electron beam lithography tools that are used for the manufacturing of the reticle. In such measurements, dimensions of test features on a reticle and/or test features on a wafer that are formed using the reticle may be measured.

The test features may be provided in test cells, which may be provided in a die area of a reticle for forming in-die test cells which are arranged between functional circuit features of an integrated circuit. The test cells may include arrangements of test features for performing various measurements, as described above.

In advanced technology nodes, for example in the 28 nm technology node or below, only relatively small amounts of space may be available between circuit features, which may be as small as $9 \times 3.5$ µm$^2$ or $4 \times 2$ µm$^2$ in front-end-of-line (FEOL) layers of the integrated circuit, and $4 \times 4$ µm$^2$ in back-end-of-line (BEOL) layers, and the possibilities for inclusion of test cells into middle-of-line (MOL) layers of the integrated circuit may be even more limited.

Embodiments disclosed herein provide methods that may allow an inclusion of test cells into layouts of integrated circuits formed in accordance with advanced technology nodes.

Furthermore, embodiments disclosed herein provide methods for an inclusion of test cells into middle-of-line layers of the integrated circuit, such as a via-zero layer, wherein vias providing electrical connections between a metal-one layer (sometimes also denoted as "first metal layer" or "1X metal layer") of the integrated circuit, which is the lowest metal layer of the integrated circuit, and contacts for providing electrical connections to circuit features such as field effect transistors are formed.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

An illustrative method disclosed herein includes, among other things, receiving a layout of an integrated circuit that includes a plurality of layers. One of the plurality of layers of the integrated circuit is selected. One or more tile number values are provided. A die area of the integrated circuit is partitioned into a plurality of tiles on the basis of the one or more tile number values. For each of the plurality of tiles, it is determined, on the basis of the layout, if a portion of the selected one of the plurality of layers of the integrated circuit in the tile has an available space for inclusion of one of a test cell and a dummy cell, and a label indicative of a result of the determining is assigned to the tile. It is determined, on the basis of the labels assigned to the tiles, if one or more space availability criteria are fulfilled. If the one or more space availability criteria are fulfilled, the labels are used for including at least one of one or more test cells and one or more dummy cells into the layout.

Another illustrative method disclosed herein includes, among other things, receiving a layout of an integrated circuit that includes a plurality of layers. One of the plurality of layers of the integrated circuit is selected. One or more tile number values are provided. A die area of the integrated circuit is partitioned into a plurality of tiles on the basis of the one or more tile number values. The array of tiles includes a plurality of rows and a plurality of columns. Each tile is arranged in one of the rows and one of the columns. The one or more tile number values include a number of rows of the array and a number of columns of the array. For each of the plurality of tiles, it is determined, on the basis of the layout, if a portion of the selected one of the plurality of layers of the integrated circuit in the tile has an available space for inclusion of one of a test cell and a dummy cell by determining if the portion of the selected layer of the integrated circuit in the tile comprises a space without circuit features of the integrated circuit having a size equal to or greater than a size of the test cell and the dummy cell. A label indicative of a result of the determining is assigned to the tile. It is determined, on the basis of the labels assigned to the tiles, if one or more space availability criteria are fulfilled. If the one or more space availability criteria are fulfilled, the labels are used for including at least one of one or more test cells and one or more dummy cells into the layout.

BRIEF DESCRIPTION OF THE DRAWINGS

The disclosure may be understood by reference to the following description taken in conjunction with the accompanying drawings, in which like reference numerals identify like elements, and in which:

FIG. 5 schematically illustrates space availability information provided on the basis of a layout of a layer of an integrated circuit;

FIGS. 6 and 7 schematically illustrate an amendment of a layout of an integrated circuit by inclusion of test cells and dummy cells into layers of the integrated circuit;

FIGS. 8-10 schematically illustrate an amendment of a layout of an integrated circuit by inclusion of test cells and dummy cells into layers of the integrated circuit.

Figure 1:
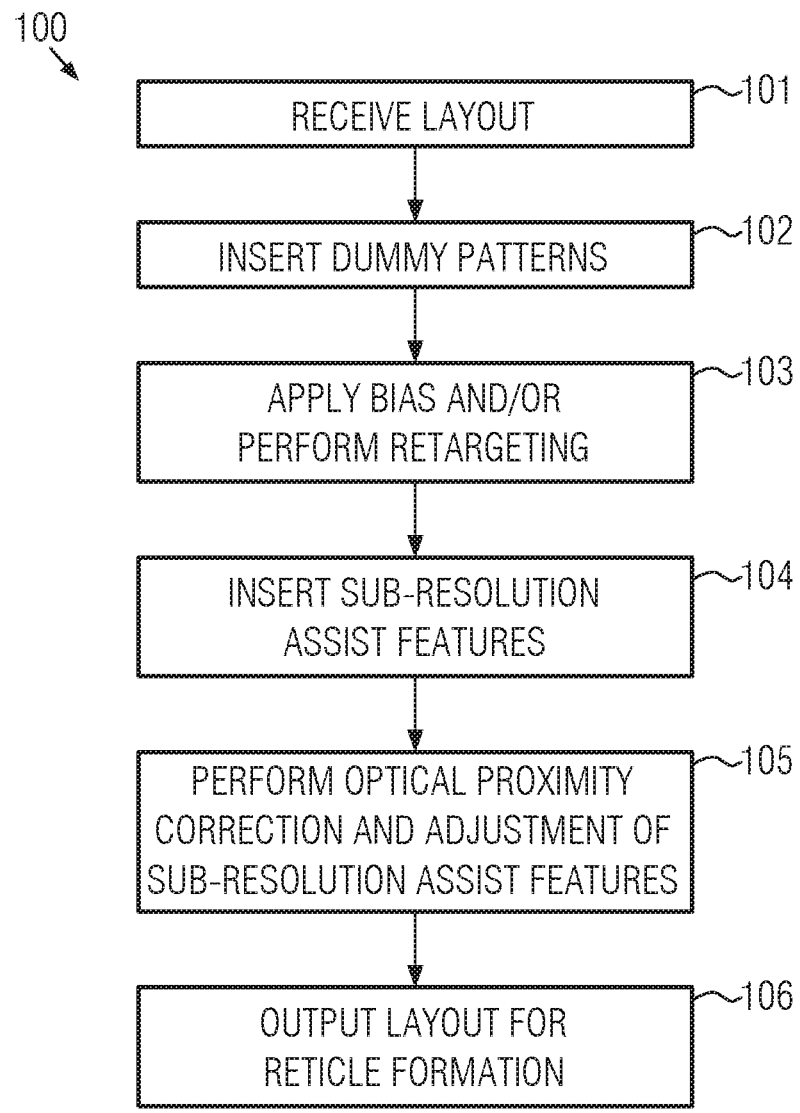
FIG. 1 shows a schematic flow diagram illustrating a processing of a layout of an integrated circuit.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Figure 2A:
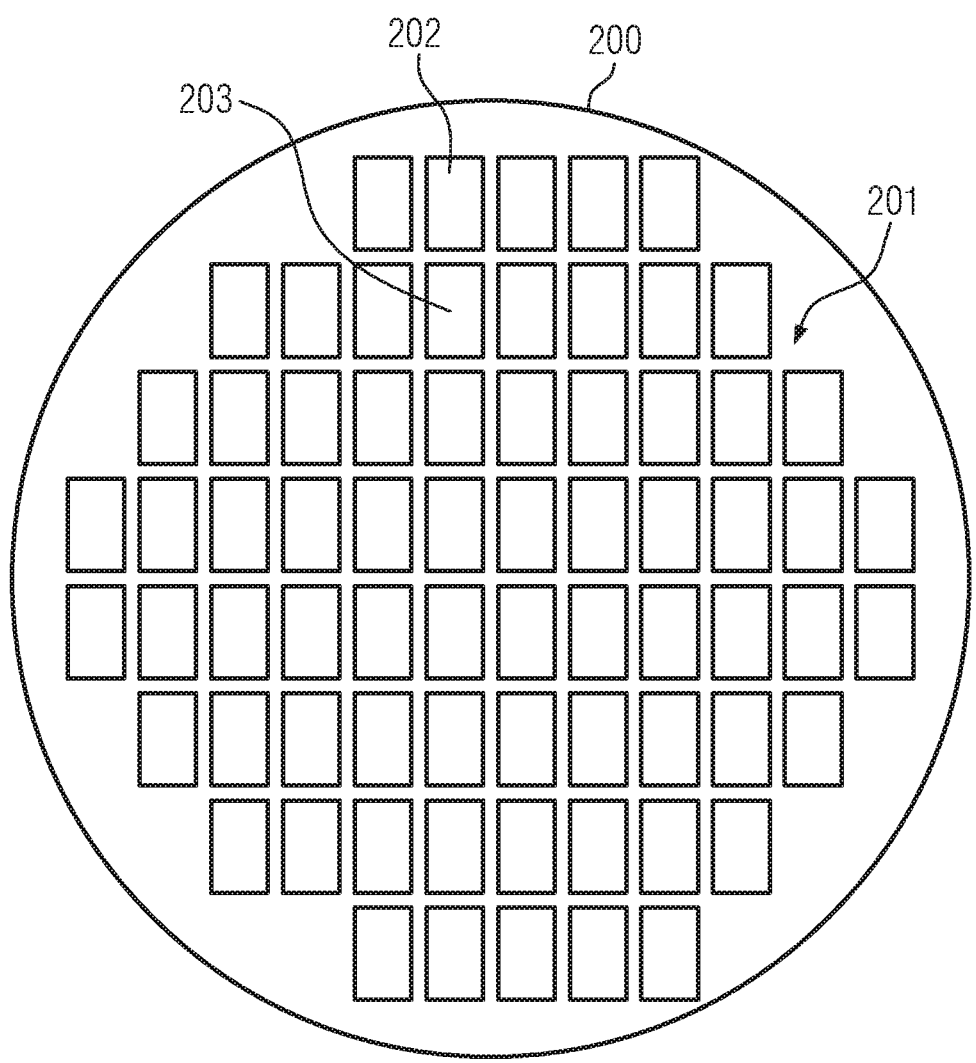
FIG. 2A shows a schematic view of a semiconductor wafer.
Figure 2B:
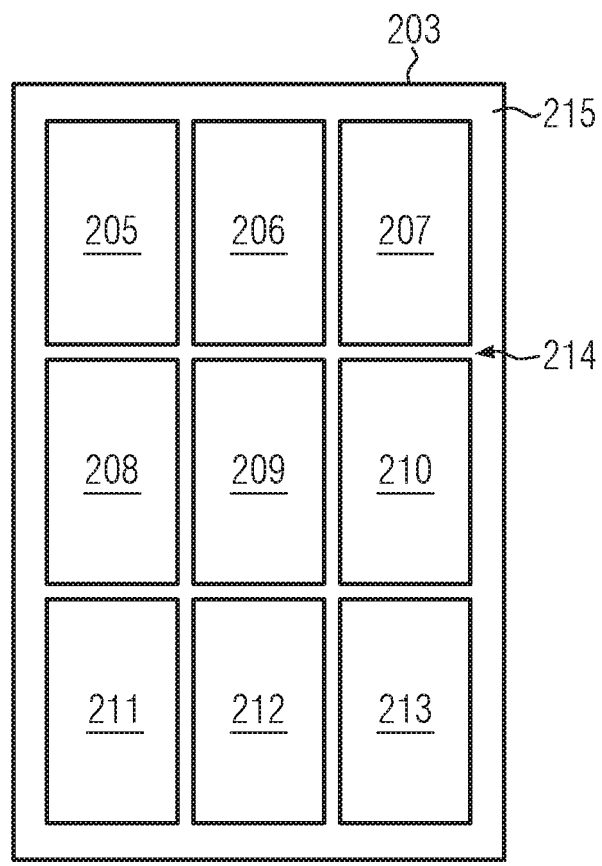
FIGS. 2B and 2C show schematic enlarged views of intra-field areas of a semiconductor wafer.

FIG. 2A shows a schematic top view of a semiconductor wafer 200. The wafer 200 may include a plurality of intra-field areas 201. In FIG. 2A, reference numerals 202, 203 exemplarily denote two of the intra-field areas of the plurality of intra-field areas 201. In each intra-field area of the plurality of intra-field areas 201, one or more integrated circuits may be formed. FIG. 2B shows a schematic enlarged view of the intra-field area 203 in an embodiment. The intra-field area 203 includes a prime area 214 and a frame area 215 that extends around the prime area 214. The prime area 214 includes a plurality of die areas 205-213. In each of the die areas 205-213, one integrated circuit may be formed on the wafer, wherein configurations of the integrated circuits formed in the die areas 205-213 may be substantially identical. After the completion of the formation of the integrated circuits, the wafer 200 may be cut for forming individual integrated circuits.

The number of the die areas 205-213 in the prime area 214 shown in FIG. 2B is of an exemplary nature only. In other embodiments, a plurality of die areas including a number of die areas that is different from the nine die areas shown in FIG. 2B may be provided.

Figure 2C:
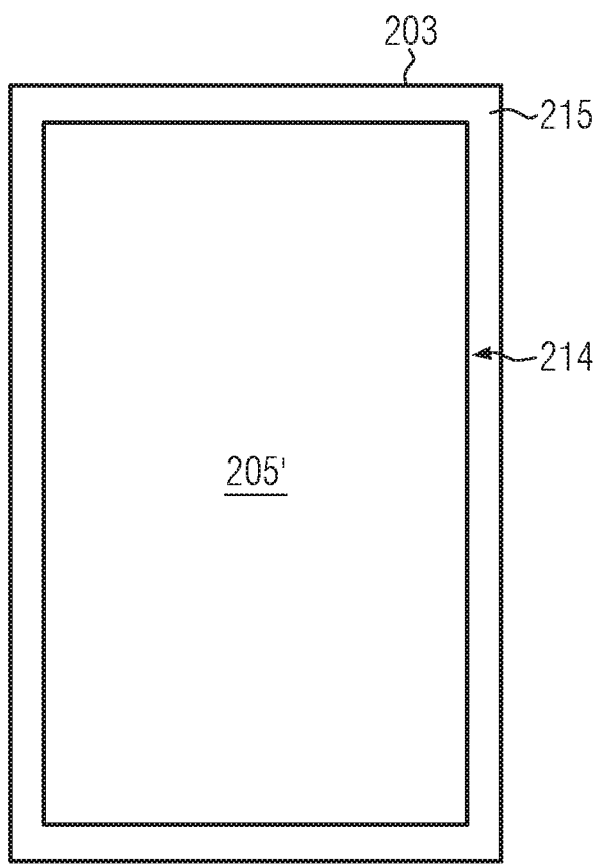

In further embodiments, the intra-field area 203 may have a configuration as shown in FIG. 2C, wherein the prime area 214 includes a single die area 205'. In the die area 205', an integrated circuit may be formed. Similar to the embodiments described above with reference to FIG. 2B, the intra-field area 203 may further include a frame area 215 that extends around the prime area 214. A configuration of the intra-field area 203 as shown in FIG. 2C may be used, for example, in embodiments wherein the wafer 200 is a multiple process wafer (MPW).

Other intra-field areas of the plurality of intra-field areas 201, such as, for example, the intra-field area 202, may have a configuration corresponding to that of the intra-field area 203.

In embodiments disclosed herein, which will be described in detail below, test cells and dummy cells may be included into a layout of integrated circuits formed in die areas on the wafer 200, such as the die areas 205-213, 205' described above with reference to FIGS. 2B and 2C. The layout including the test cells and dummy cells may then be used for forming reticles for photolithography processes that are performed in the manufacturing of the integrated circuits. The test cells and dummy cells may be in-die test cells and in-die dummy cells that are formed between circuit features of the integrated circuits in the die areas.

Figure 3:
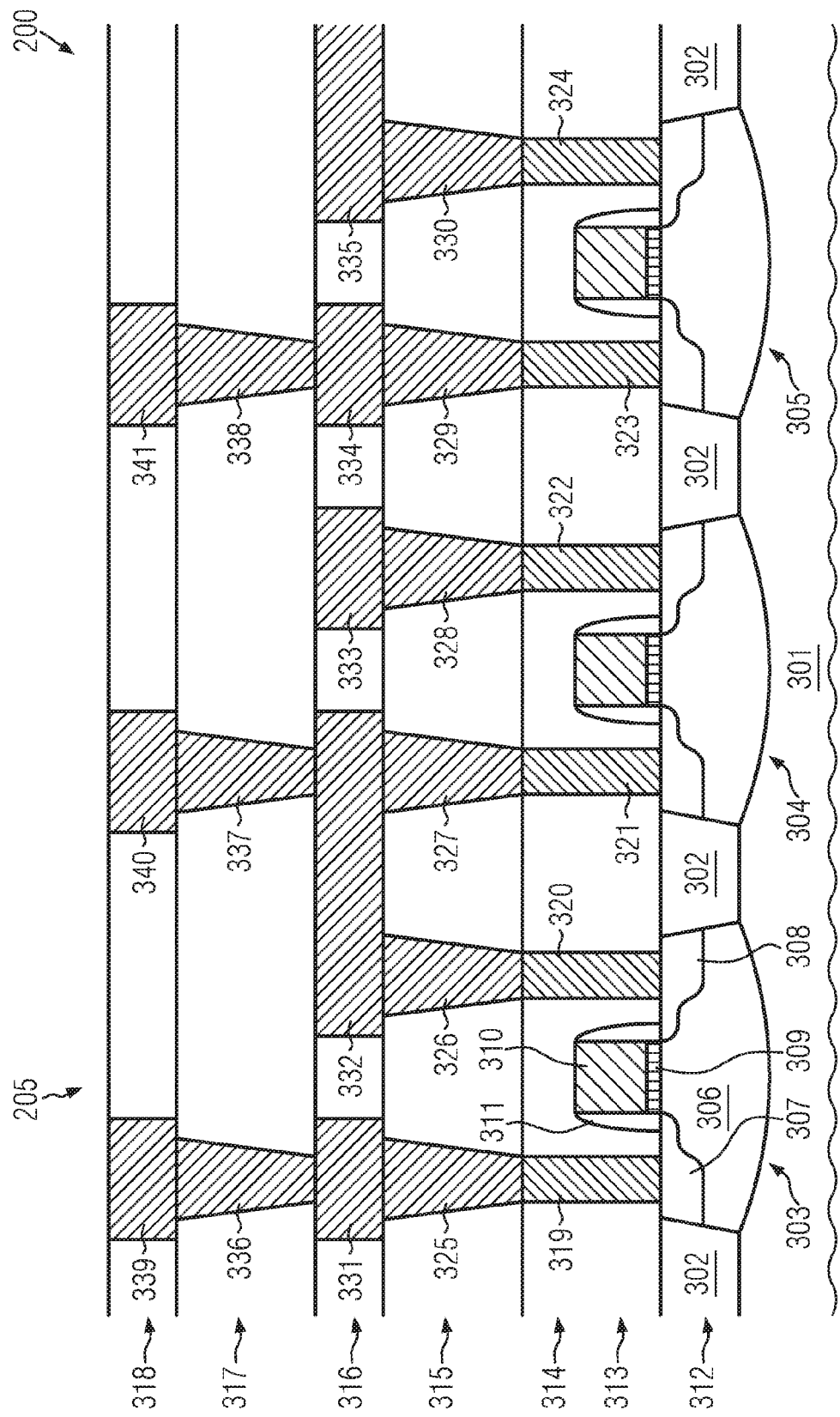
FIG. 3 shows a schematic cross-sectional view of a portion of an integrated circuit.

FIG. 3 shows a schematic cross-sectional view of a portion of the wafer 200 in one of the die areas on the wafer. In the following, for convenience, reference will be made to die area 205. Features of other die areas, and techniques for the inclusion of test cells and dummy cells into other die areas such as, for example, the die areas 206 to 213 shown in FIG. 2B, or the die area 205' shown in FIG. 2C, may correspond to those of the die area 205, and a detailed description thereof will be omitted.

The wafer 200 includes a substrate 301. The substrate 301 includes a semiconductor material such as, for example, silicon. In some embodiments, the substrate 301 may be a bulk silicon substrate. In other embodiments, the substrate 301 may be a silicon-on-insulator (SOI) substrate.

In the die area 205, a plurality of field effect transistors 303, 304, 305 may be formed.

The field effect transistor 303 includes an active region 306 that is provided in the semiconductor material of the substrate 301. In the active region 306, a source region 307 and a drain region 308 of the field effect transistor 303 are provided. A channel region of the field effect transistor 303 is provided by a portion of the active region 306 between the source region 307 and the drain region 308 that is doped differently than the source region 307 and the drain region 308. Above the channel region, a gate electrode 310 may be provided that is separated from the active region 306 by a gate insulation layer 309 and flanked by a sidewall spacer 311. Features of the field effect transistors 304, 305 and further field effect transistors in other portions of the die area 205 that are not shown in FIG. 3 may correspond to that of the field effect transistor 303.

The active regions of the field effect transistors 303, 304, 305 may be separated from each other by a trench isolation structure 302 that provides electrical insulation between the active regions. The active regions of the field effect transistors 303, 304, 305 and the trench isolation structure 302 are provided in an active layer 312 of the integrated circuit.

For forming the trench isolation structure 302, trenches may be formed in the substrate 301, and techniques of oxidation, deposition and chemical mechanical polishing may be performed for filling the trenches with an electrically insulating material, such as silicon dioxide. The trenches may be formed by forming a photoresist mask over the substrate 301 and performing an etch process adapted to remove the semiconductor material of the substrate 301 in the presence of the photoresist mask. The photoresist mask employed in the formation of the trench isolation structure 302 may be formed by means of a photolithography process wherein one or more reticles are used that are formed on the basis of layer layout information for the active layer 312 that is provided in the layout of the integrated circuit.

The gate electrodes and gate insulation layers of the field effect transistors 303, 304, 305 are provided in a poly layer 313 of the integrated circuit that is formed in the die area 205. For forming the gate electrodes and gate insulation layers, a gate stack including materials of the gate insulation layers and gate electrodes may be deposited over the substrate 301, and the materials of the gate insulation layers and the gate electrodes may be patterned by means of one or more etch processes that are performed in the presence of a photoresist mask formed by means of a photolithography process. One or more reticles that are used in this photolithography process may be formed on the basis of layer layout information for the poly layer 313 that is provided in the layout of the integrated circuit.

While, in some embodiments, the gate electrodes of the field effect transistors 303, 304, 305 may include polysilicon, in other embodiments, the gate electrodes may include materials other than polysilicon, for example, one or more metals. The term "poly layer" used herein is intended to include both embodiments wherein polysilicon is used for the gate electrodes, and embodiments wherein the gate electrodes include materials other than polysilicon. Furthermore, in some embodiments, replacement gate processes may be used, wherein dummy gate electrodes are formed over the substrate 301, and the dummy gate electrodes are replaced with final gate electrodes of the field effect transistors 303, 304, 305 in later stages of the manufacturing process. In such embodiments, the dummy gate electrodes may be formed by means of a photolithography process wherein one or more reticles are used, the one or more reticles being formed on the basis of layer layout information for the poly layer 313.

The integrated circuit may further include a contact layer 314 that includes contacts 319 to 324. The contacts 319 to 324 may include an electrically conductive material such as, for example, tungsten, and they may be formed in an interlayer dielectric over the substrate 301. The contacts 319 to 324 may provide electrical connections to source and drain regions of the transistors 303, 304, 305. Additionally, the contact layer 314 may include contacts providing electrical connections to gate electrodes of the field effect transistors 303, 304, 305.

The contacts 319 to 324 may be formed by forming contact holes in the interlayer dielectric of the contact layer 314 and filling the contact holes with the electrically conductive metal. For forming the contact holes, a photoresist mask may be formed over the wafer 200, and an etch process may be performed in the presence of the photoresist mask. The photoresist mask may be formed by means of a photolithography process, wherein one or more reticles are used that are formed on the basis of layer layout information for the contact layer 314 that is provided in the layout of the integrated circuit to be formed in the die area 205.

The integrated circuit may further include a via-zero layer 315, which is sometimes also denoted as "first connecting layer" or "first connecting via layer." The via-zero layer 315 may include contact vias 325 to 330 that are formed in an interlayer dielectric of the via-zero layer 315. The contact vias 325 to 330 may be filled with an electrically conductive material that is different from the material of the contacts 319 to 324. In particular, in some embodiments, the contact vias 325 to 330 may be filled with copper. The formation of the contact vias 325 to 330 may include a photolithography process wherein a photoresist mask defining the contact vias 325 to 330 is formed by means of one or more reticles that are provided on the basis of layer layout information for the via-zero layer 315 that is provided in the layout of the integrated circuit.

The integrated circuit may further include a metal-one layer 316 that includes electrically conductive lines 331 to 335. The electrically conductive lines 331 to 335 may be formed by etching an interlayer dielectric of the metal-one layer 316 in the presence of a photoresist mask, wherein the photoresist mask is formed in a photolithography process wherein one or more reticles are used, the reticles being formed on the basis of layer layout information for the metal-one layer 316 that is provided in the layout of the integrated circuit. In the etch process, trenches may be formed, which may then be filled with an electrically conductive material, such as copper.

The integrated circuit may further include a via-one layer 317 and a metal-two layer 318. The via-one layer 317 includes contact vias 336 to 338, and the metal-two layer 318 includes electrically conductive lines 339 to 341. The contact vias 336 to 338 and the electrically conductive lines 339 to 341 may be filled with an electrically conductive material, such as copper, wherein the contact vias 336 to 338 in the via-one layer 317 provide electrical connections between the metal lines 331 to 335 in the metal-one layer 316 and the electrically conductive lines 339 to 341 in the metal-two layer 318. The formation of the contact vias 336 to 338 in the via-one layer 317 and the formation of the electrically conductive lines 339 to 341 in the metal-two layer 318 may include photolithography processes, wherein, in each of the photolithography processes, one or more reticles are used. The reticles used for the formation of the contact vias 336 to 338 in the via-one layer 317 may be formed on the basis of layer layout information for the via-one layer 317 that is provided in the layout of the integrated circuit, and the one or more reticles used in the formation of the electrically conductive lines 339 to 341 in the metal-two layer may be formed on the basis of layer layout information for the metal-two layer 318 that is provided in the layout of the integrated circuit.

Further techniques for the formation of the contact vias and electrically conductive lines in the via-zero layer 315, the metal-one layer 316, the via-one layer 317 and the metal-two layer 318 may correspond to known techniques used in the formation of contact vias and electrically conductive lines by means of damascene and/or dual damascene techniques.

In addition to the layers shown in FIG. 3, the integrated circuit may include further via layers and metal layers, wherein the contact vias in the via layers provide electrical connections between electrically conductive lines in different metal layers. The layout of the integrated circuit may include layer layout information for each of the via layers and metal layers that may be used for the formation of reticles that are employed in photolithography processes that are performed for forming the contact vias and electrically conductive lines in the respective layers of the integrated circuit.

The active layer 312 and the poly layer 313 provide front-end-of-line (FEOL) layers of the integrated circuit. The contact layer 314 and the via-zero layer 315 provide middle-of-line (MOL) layers of the integrated circuit. The metal-one layer 316, the via-one layer 317, the metal-two layer 318 and higher via and metal layers provide back-end-of-line (BEOL) layers of the integrated circuit.

In embodiments disclosed herein, test cells may be provided in some or all of the active layer 312, the poly layer 313, the contact layer 314, the via-zero layer 315, the metal-one layer 316, the via-one layer 317, the metal-two layer 318 and higher via layers and metal layers of the integrated circuit formed in die area 205 at the wafer 200. Similarly, test cells may also be included into integrated circuits formed in other die areas on the wafer 200. In some embodiments, the integrated circuits formed in all die areas on the wafer 200 may be formed on the basis of the same layout of the integrated circuit so that all of the integrated circuits formed on the wafer 200 are substantially identical.

The test cells may be provided at locations in the layers 312 to 318 of the integrated circuit where there is an available space between circuit features providing the functionality of the integrated circuit, such as the various features shown in FIG. 3. For providing a test cell in a layer of the integrated circuit, the layer layout information in the layout of the integrated circuit for the respective layer may be amended by including target features and/or reticle features for the test cell, which will be denoted as "including a test cell into a layer of the integrated circuit." When the thus amended layout of the integrated circuit is used for the formation of reticles, and the reticles are used in photolithography processes in semiconductor manufacturing processes performed at the wafer 200, structural features corresponding to the test cell are formed in integrated circuits formed in the wafer 200.

For each of the layers of the integrated circuit, the structural features corresponding to a test cell in the layer may include features that are similar to circuit features of the integrated circuit in the respective layer. For example, when a test cell is included into the active layer 312, trenches filled with an electrically insulating material similar to the trench isolation structure 302 may be formed. When a test cell is included into the poly layer 313, features similar to the gate electrodes of the field effect transistors 303 to 305 may be formed. When a test cell is included into the contact layer 314, features similar to the contacts 319 to 334 may be formed. When a test cell is included into the via-zero layer 315, the via-one layer 317 or a higher via layer, features similar to contact vias may be formed, and when a test cell is included in the metal-one layer 316, the metal-two layer 318 or a higher metal layer, features similar to electrically conductive lines may be formed. The test cells may include regular arrangements of features that may be used for measuring reticle critical dimensions and wafer critical dimensions and for process monitoring using known techniques such as electron microscopy and/or spectrometry. Moreover, the test cells may provide open circuits that may be used for measurement purposes, wherein there are no electrical connections between test cells in FEOL layers of the integrated circuit and test cells in BEOL layers of the integrated circuit. Additionally, the test cells may include alignment marks that may be used for measuring a reticle registration and/or a process registration. Further features of test cells may correspond to features of known test cells used in semiconductor manufacturing.

The inclusion of test cells into the integrated circuit may be subject to constraints that are caused by issues in separating features corresponding to test cells in different layers of the integrated circuit that are arranged close to each other, for example on top of each other, in measurement processes and/or constraints relating to the provision of open circuits. For example, there may be issues in separating features formed on the basis of test cells in the active layer 312 and in the poly layer 313 that are arranged close to each other. Furthermore, there may be issues in separating features formed on the basis of test cells in the via-zero layer 315 and the via-one layer 317 that are close to each other. Therefore, there may be a constraint that test cells in the active layer and in the poly layer should not be placed close to each other. Furthermore, there may be a constraint that test cells in the via-zero layer 315 and test cells in the via-one layer 317 should not be placed close to each other. Providing a constraint that test cells in the via-zero layer 315 and test cells in the via-one layer 317 should not be placed close to each other may also help to provide open circuits since, thus, it can be ensured that there are no test cells in the via-one layer 317 and in the via-zero layer 315 that are located above each other and might be electrically connected.

In embodiments disclosed herein, in addition to test cells that are used for forming features in the integrated circuit that may be used for measurement purposes, dummy cells may be included into layers of the integrated circuit. Similar to an inclusion of a test cell into a layer of the integrated circuit, an inclusion of a dummy cell into a layer of the integrated circuit may be performed by amending the layer layout information for the respective layer in the layout of the integrated circuit for including target features and/or reticle features for the dummy cell. Dummy cells may be used for forming features in the integrated circuit that may help to avoid disturbances in the manufacturing of the integrated circuit. For example, in some embodiments, dummy cells may be used for forming features that are provided for maintaining a density of features formed in a layer of the integrated circuit close to a value that is favorable in view of a manufacturability of the integrated circuit.

In some embodiments, when a test cell is included into the poly layer in a portion of the integrated circuit, a dummy cell may be included into the active layer in this portion of the integrated circuit for avoiding disturbances of the manufacturing of the integrated circuit that might be caused by substantially featureless regions in the active layer 312. Similarly, when a test cell is included into a portion of the integrated circuit in the via-zero layer, a dummy cell may be provided in the metal-one layer in the region of the metal-one layer for avoiding disturbances of the manufacturing process that might be caused by a substantially featureless region in the metal-one layer.

In the following, techniques that may be used for amending the layout of an integrated circuit by including test cells and dummy cells into the layers of the integrated circuit as defined in the layout will be described.

Figure 4:
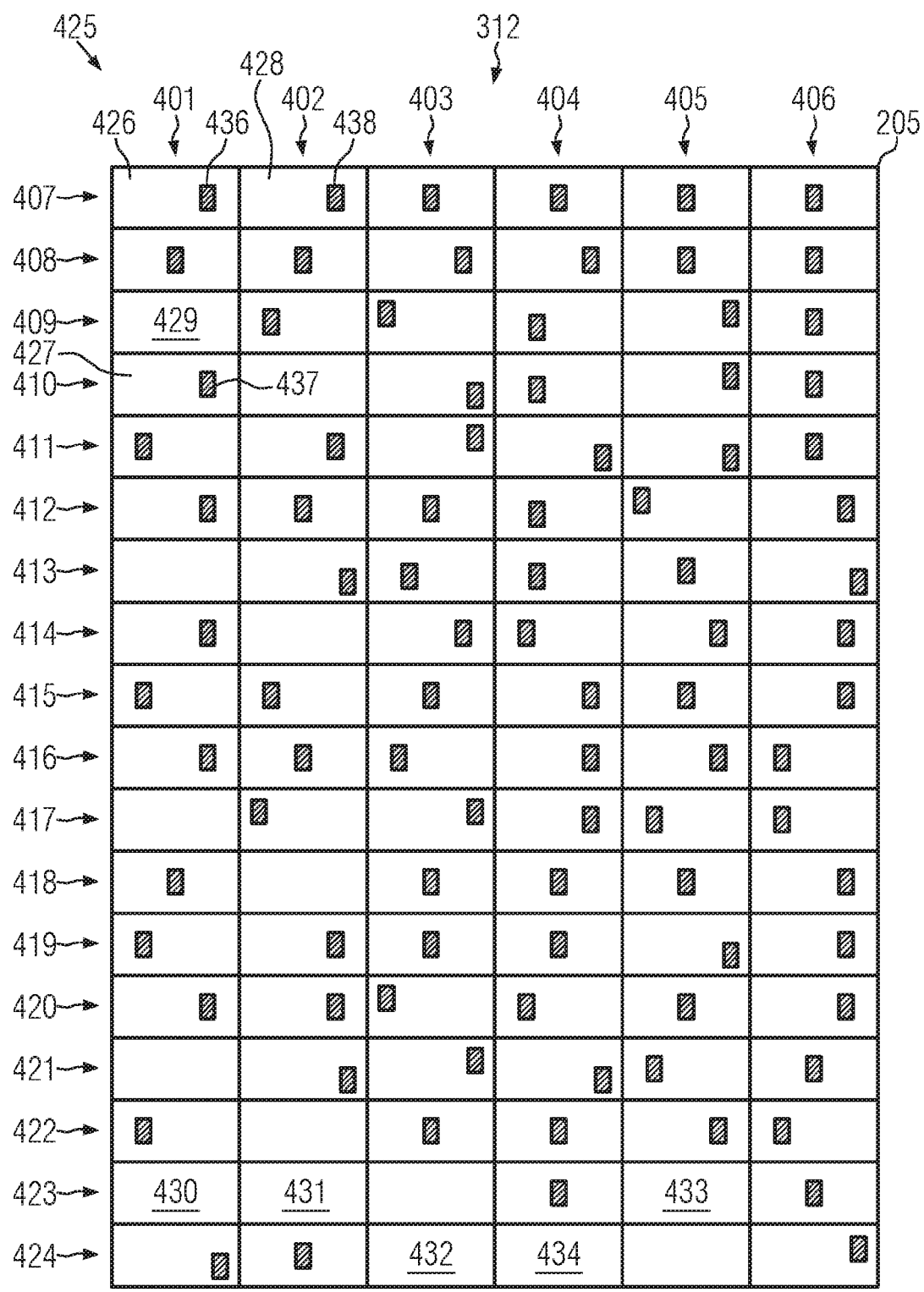
FIG. 4 schematically illustrates features of a layer of a layout of an integrated circuit.

FIG. 4 shows a schematic view illustrating features of the layout of the active layer 312 of the integrated circuit that is formed in the die area 205 on the wafer 200. For simplicity, in FIG. 4, features of the layout of the integrated circuit in the active layer 312 that are provided for forming circuit features providing the functionality of the integrated circuit as described above with reference to FIG. 3 have been omitted.

The layout of the integrated circuit may include regions wherein no target features or reticle features corresponding to circuit features of the integrated circuit to be formed are provided, and which have a size that is sufficient for the inclusion of either a test cell or a dummy cell. Such regions in the active layer 312 may provide an available space for inclusion of a test cell or a dummy cell.

In some embodiments, an available space for inclusion of a test cell or a dummy cell may be a space that is not required for providing circuit features of the integrated circuit and has a size equal to or greater than a minimum size that corresponds to a size of a test cell and a size of a dummy cell, wherein, in some embodiments, the sizes of test cells and dummy cells may be approximately equal.

In FIG. 4, each available space for inclusion of a test cell or a dummy cell is schematically shown as a hatched area, wherein some of the available spaces for inclusion of a test cell or a dummy cell are exemplarily denoted by reference numerals 436, 437, 438.

Similar to the active layer 312 shown in FIG. 4, other layers of the integrated circuit such as the poly layer 313, the contact layer 314, the via-zero layer 315, the first metal layer 316, the first via layer 317, the second metal layer 318, and higher via layers and metal layers may also include available spaces for inclusion of test cells or dummy cells, wherein numbers and locations of the available spaces for inclusion of test cells or dummy cells may be different between the layers, although there may be a certain degree of correlation between the locations of available spaces for inclusion of test cells or dummy cells in adjacent layers.

In the following, methods that may be used for providing space availability information that is representative of the presence of available spaces for inclusion of a test cell or a dummy cell in a layer of the integrated circuit will be described for the active layer 312. However, in some embodiments, techniques as described herein may also be applied to other layers of the integrated circuit such as, for example, the first metal layer 316.

Figure 11:
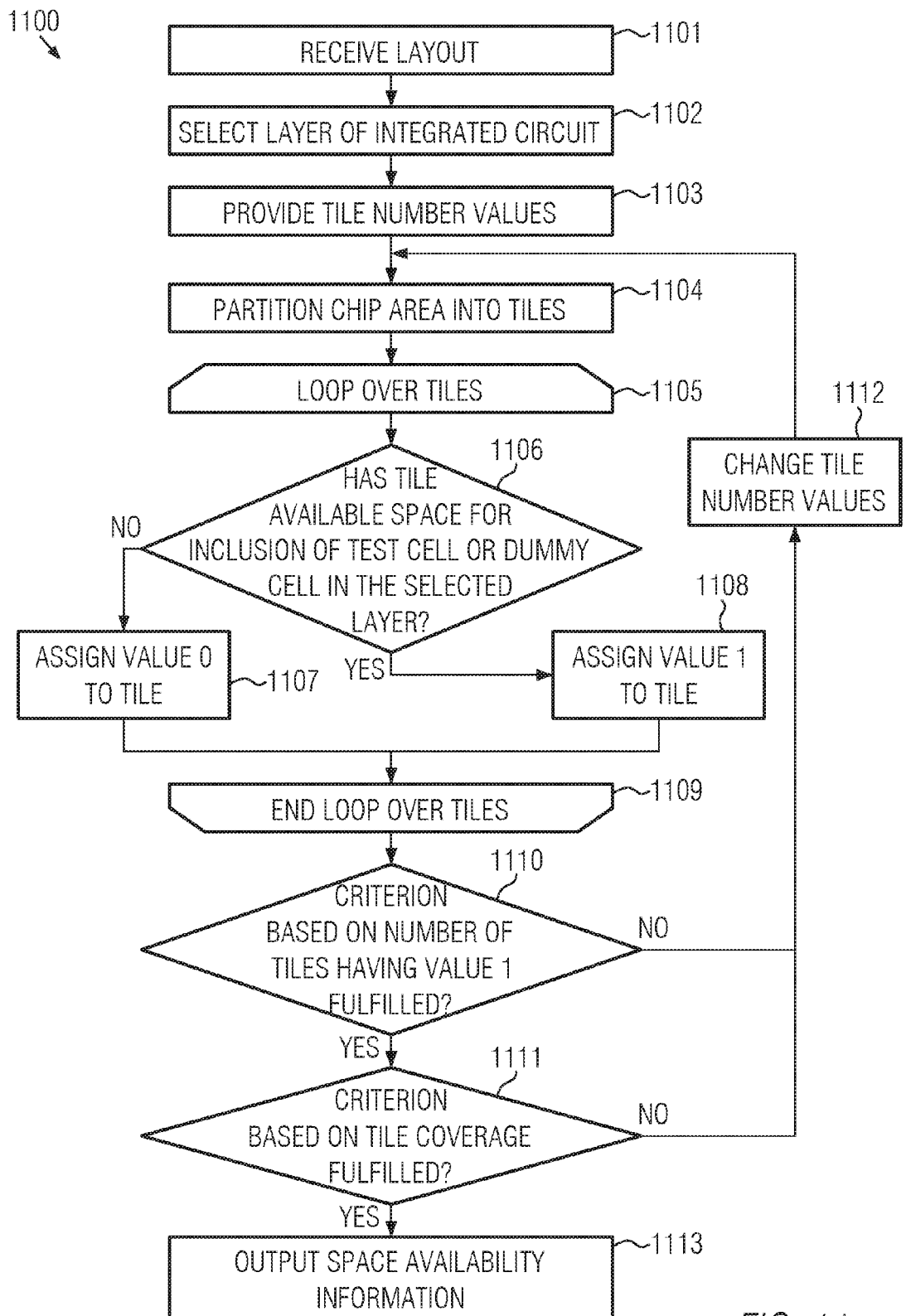
FIGS. 11 and 12 show schematic flow diagrams illustrating methods disclosed herein.

FIG. 11 shows a schematic flow diagram 1100 of a method according to an embodiment. At 1101, the layout of the integrated circuit may be received. In some embodiments, the method illustrated by the flow diagram 1100 may be performed before an optical proximity correction is performed, and after an insertion of sub-resolution assist features into the layout of the integrated circuit. In such embodiments, the layout of the integrated circuit may be received after the insertion of sub-resolution assist features, for example after the insertion of sub-resolution assist features in a method similar to the method illustrated by the flow diagram 100 of FIG. 1 at 104. In other embodiments, the method as illustrated by the flow diagram 1100 may be performed in a method similar to the method illustrated by the flow diagram 100 of FIG. 1 after the optical proximity correction performed at 105 and before the layout is output for reticle formation at 106.

At 1102, one of the layers of the integrated circuit may be selected. The selected layer of the integrated circuit may be the active layer 312 or another one of the layers 312 to 318 of the integrated circuit, such as, for example, the metal-one layer 316.

At 1103, tile number values may be provided. The tile number values provided at 1103 may be starting values of tile numbers that define a partitioning of the die area 205 of the integrated circuit into a plurality of tiles, for example, a partitioning of the die area 205 into an array of tiles that includes a plurality of rows and a plurality of columns, as will be described in more detail below. The starting values for the tile number values may be provided in the form of a starting value N for the number of columns of the array of tiles and a starting value M for the number of rows of the array of tiles. The starting values for the tile number values N, M may be provided on the basis of a desired minimum number of test cells that are to be included into the integrated circuit, wherein relatively small starting values of the tile number values N, M may be provided when only a relatively small number of test cells is to be included into the integrated circuit, and relatively large starting values of the tile number values N, M may be provided if a relatively large number of test cells is to be included into the integrated circuit. In some embodiments, the starting values of the tile number values N, M may be selected such that a product N×M of the starting values of the tile number values is approximately equal to the minimum number of test cells that are to be included into the integrated circuit. In some embodiments, the starting value of each of the tile number values N, M may be in a range from about 4 to about 20 for each of the dies 205-213 (FIG. 2B) that may be provided in a production reticle, or for the die 205' (FIG. 2C) that may be provided in reticles for use with multiple process wafer (MPW) devices.

At 1104, the die area 205 of the integrated circuit may be partitioned into tiles on the basis of the tile number values N, M. As already mentioned above, in the partitioning of the die area 205 into tiles, the die area 205 may be partitioned into an array 425 of tiles that includes a plurality of columns and a plurality of rows. In FIG. 4, reference numerals 401 to 406 denote the columns of the array 425 of tiles, and reference numerals 407 to 424 denote the rows of the array 425 of tiles. The array 425 of tiles, as exemplarily shown in FIG. 4, is provided on the basis of a tile number value N denoting the number of columns that is equal to 6 and a tile number value M denoting the number of rows of the array 425 of tiles equal to 18.

Each of the tiles of the array 425 of tiles may include a portion of a die area 205 of the integrated circuit, in particular a portion of a die area 205 of the integrated circuit having an approximately rectangular shape. The sizes of the tiles of the array 425 may be substantially equal, and adapted such that the array 425 of tiles covers substantially the entire die area 205.

Each of the tiles of the array 425 of tiles is located in one of the columns 401 to 406 of the array 425 and in one of the rows 407 to 424 of the array 425. In FIG. 4, reference numerals 426 to 434 exemplarily denote some of the tiles of the array 425 of tiles, wherein tiles 426, 427, 429 and 430 are in column 401, tiles 428 and 431 are in column 402, tile 432 is in column 403, tile 434 is in column 404, and tile 433 is in column 405. Tiles 426 and 428 are in row 407, tile 429 is in row 409, tile 427 is in row 410, tiles 430, 431 and 433 are in row 423, and tiles 432, 434 are in row 424.

After partitioning the die area 205 into tiles at 1104, a loop over the tiles of the array 425 of tiles may be performed. The loop over the tiles starts at 1105 and ends at 1109.

In some embodiments, the loop over the tiles that is performed between 1105 and 1109 may be provided in the form of two nested loops, wherein one of the loops, for example the outer loop, is performed over the columns 401 to 406 of the array 425, and the other loop, for example the inner loop, is performed over the rows 407 to 424 of the array 425.

In the loop over the tiles performed between 1105 and 1109, it is determined, for each of the tiles, if the tile has an available space for inclusion of a test cell or a dummy cell in the layer of the integrated circuit that was selected at 1102. This may be done on the basis of the layout of the integrated circuit that was received at 1101. For determining if a tile has an available space for inclusion of a test cell or a dummy cell, the layer layout information for the selected layer may be analyzed for determining if the portion of the selected layer of the integrated circuit in the tile includes at least one space without circuit features of the integrated circuit that has a size sufficient for a test cell or a dummy cell. In particular, it may be determined, on the basis of the layout, if the portion of the layer of the integrated circuit in the tile includes at least one space that does not include circuit features that are formed for providing the electrical functionality of the integrated circuit, and that has a size equal to or greater than the sizes of the test cell and the dummy cell.

A space without circuit features that are formed for providing the electrical functionality of the integrated circuit may be either a space in the selected layer of the integrated circuit wherein the layout of the integrated circuit does not include any target features or reticle features in the selected layer of the integrated circuit at all, or a space wherein the layer of the integrated circuit includes only target features or reticle features of dummy patterns such as the dummy patterns that are inserted in the method described above with reference to FIG. 1 at 103 in the flow diagram 100 shown in FIG. 1. For determining if the portion of the selected layer of the integrated circuit in the tile includes a space having a sufficient size for the inclusion of a test cell or a dummy cell, the layout of the integrated circuit may be analyzed by means of well-known tools for the processing of layouts of integrated circuits, such as those provided by Mentor Graphics, Brion and Synopsys.

Depending on the result of the determination if the tile has an available space for inclusion of a test cell or a dummy cell in the selected layer of the integrated circuit, a label that is indicative of a result of the determining may be assigned to the tile. In some embodiments, the assignment of a label to the tile may include an assignment of a value of zero to the tile, which may be performed at 1107 if it has been determined at 1106 that there is no available space for inclusion of a test cell or a dummy cell in the tile, or an assignment of a value of one to the tile, which may be performed at 1108 if it has been determined at 1106 that the tile has an available space for inclusion of a test cell or a dummy cell in the selected layer of the integrated circuit.

In some embodiments, the values that are assigned to the tiles at 1107 or 1108 in the loop over the tiles between 1105 and 1109 may be provided in a matrix. FIG. 5 shows an example of a matrix 500 may can be obtained on the basis of the partitioning of the die area 205 of the integrated circuit into the array 425 of tiles shown in FIG. 4. The matrix 500 includes a plurality of columns and a plurality of rows that correspond to the columns 401 to 406 and rows 407 to 424 of the array 425 of tiles. For convenience, in FIG. 5, the reference numerals 401 to 406 that are used in FIG. 4 for denoting the columns of the array 425 of tiles are used for denoting the columns of the matrix 500, and the reference numerals 407 to 424 that are used in FIG. 4 for denoting the rows of the array 425 of tiles are used in FIG. 5 for denoting the rows of the matrix 500. Each element of the matrix 500 is in one of the columns 401 to 406 and one of the rows 407 to 424 of the matrix 500 and has a value that corresponds to the value that was assigned to the tile in the same column and row of the array 425. Thus, each element of the matrix 500 is uniquely associated with one of the tiles of the array 425 of tiles.

For example, tile 426 in column 401 and row 407 of the array 425 of tiles includes an available space 436 into which a test cell or a dummy cell may be included. Accordingly, at 1106, it is determined for the tile 426 that the tile has an available space for inclusion of a test cell or a dummy cell, and a value of one is assigned to the tile 426 at 1108. The element of the matrix 500 in column 401 and row 407 that corresponds to the tile 426, and is denoted by reference numeral 426 in FIG. 5, is set to a value of one. Similarly, the elements of the matrix 500 corresponding to the tiles 427 and 428 that include available spaces 437 and 438 for the inclusion of a test cell or a dummy cell may be set to a value of one. For convenience, in FIG. 5, these elements of the matrix 500 have been denoted by reference numerals 427 and 428. Other elements of the matrix 500 that correspond to tiles of the array 425 of tiles that include available spaces for a test cell or a dummy cell, which, as detailed above, have been shown in FIG. 4 as hatched rectangles, may also be set to a value of 1.

In the example shown in FIG. 4, the tiles 429 to 434 of the array 425 of tiles do not include available spaces for inclusion of a test cell or a dummy cell. Accordingly, in the matrix 500 shown in FIG. 5, the elements of the matrix corresponding to these tiles, which, for convenience, have been denoted by reference numerals corresponding to the reference numerals of the tiles, may be set to the value of zero that was assigned to these tiles at 1107. Similarly, other elements of the matrix 500 that correspond to tiles of the array 425 of tiles that do not include an available space for inclusion of one of a test cell and a memory cell may be set to the value of zero.

The elements of the matrix 500 provide labels for the tiles of the array 425 of tiles. Each element of the matrix 500 provides a label for the tile in the array 425 of tiles corresponding to the respective element of the matrix 500 that is indicative of the result of the determination if the tile has an available space for inclusion of a test cell or a dummy cell that was performed at 1106.

After performing the loop over the tiles between 1105 and 1109, it may be determined if one or more space availability criteria are fulfilled. In some embodiments, it may be determined if two space availability criteria are fulfilled. In the flow diagram 1100 shown in FIG. 11, it is determined at 1110 if a first space availability criterion that is based on a number of tiles having a label that indicates that the tile has an available space for inclusion of one of a test cell is fulfilled. The criterion is fulfilled if the number of tiles having a label that indicates that the tile has an available space for inclusion of a test cell or a dummy cell is greater than a threshold value, wherein the threshold value corresponds to a minimum number of test cells that are to be included into the integrated circuit. In some embodiments, the number of tiles having a label that indicates that the tile has an available space for inclusion of a test cell and a dummy cell may be determined by counting the number of elements of the matrix 500 that have a value of one.

At 1111, it may be determined if a second space availability criterion that is based on a tile coverage is fulfilled. The tile coverage may be a ratio between the number of tiles having a label that indicates that the tile has an available space for inclusion of a test cell or a dummy cell and a total number of the tiles. In some embodiments, the tile coverage may be obtained by dividing a number of elements of the matrix 500 that have a value of one by a total number of elements of the matrix 500, wherein the total number of elements of the matrix 500 may be obtained by multiplying the number N of columns of the matrix 500 that corresponds to the number of columns of the array 425 of tiles by the number of rows of the matrix 500 that corresponds to the number M of rows of the array 425 of tiles.

The criterion that is based on tile coverage may be fulfilled if the tile coverage is greater than a threshold coverage. In some embodiments, the threshold coverage may have a value of about 50%. In other embodiments, in particular when there is only a relatively small amount of available space for inclusion of test cells and/or dummy cells in the layout of the integrated circuit, a smaller value of the threshold coverage, for example about 40%, may be provided.

If, at 1110, it is determined that the space availability criterion based on the number of tiles having a label that indicates that the tile has an available space for inclusion of a test cell or a dummy cell is not fulfilled, the tile number values may be changed at 1112. In embodiments wherein the tile number values are provided in the form of the number N of columns of the array 425 of tiles and the number M of rows of the array 425 of tiles, the tile number values may be changed by increasing one or both of the numbers N, M. Thereafter, the partitioning of the die area into tiles at 1104, the loop over the tiles between 1105 and 1109 wherein, for each of the tiles, it is determined if the tile has an available space for inclusion of a test cell or a dummy cell in the selected layer, and wherein labels indicative of a result of the determination are assigned to the tiles may be iterated.

If, at 1110, it is determined that the space availability criterion based on the number of tiles having a label that indicates that the tile has an available space for inclusion of a test cell and a dummy cell is fulfilled, at 1111, it may be determined if the space availability criterion that is based on tile coverage is fulfilled. If the criterion is not fulfilled, the tile number values may be changed at 1112, and the partitioning of the die area into tiles at 1104 and the loop over the tiles between 1105 and 1109 may be iterated.

If the criterion that is based on tile coverage is fulfilled, the matrix 500 may be output. The number of columns and rows of the matrix 500 defines the partitioning of the die area 205 of the integrated circuit into the array 425 of tiles. Furthermore, the values of the elements of the matrix 500 provides space availability information that indicates, for each of the tiles of the array 425 of tiles, if space for inclusion of a test cell and a dummy cell is available in a portion of the layer of the layout of the integrated circuit that was selected at 1102 in the tile.

In some embodiments, the values N, M of the columns and rows of the array 425 of tiles may be output as part of the matrix 500. In other embodiments, the tile number values N, M may be output separately, in addition to the matrix 500.

The partitioning of the die area 205 of the integrated circuit into the array 425 of tiles and the space availability information provided by the matrix 500 and the tile number values N, M may be used for including test cells and dummy cells into the layout of the integrated circuit, as will be described in the following with reference to FIGS. 6-10 and 12.

Figure 12:
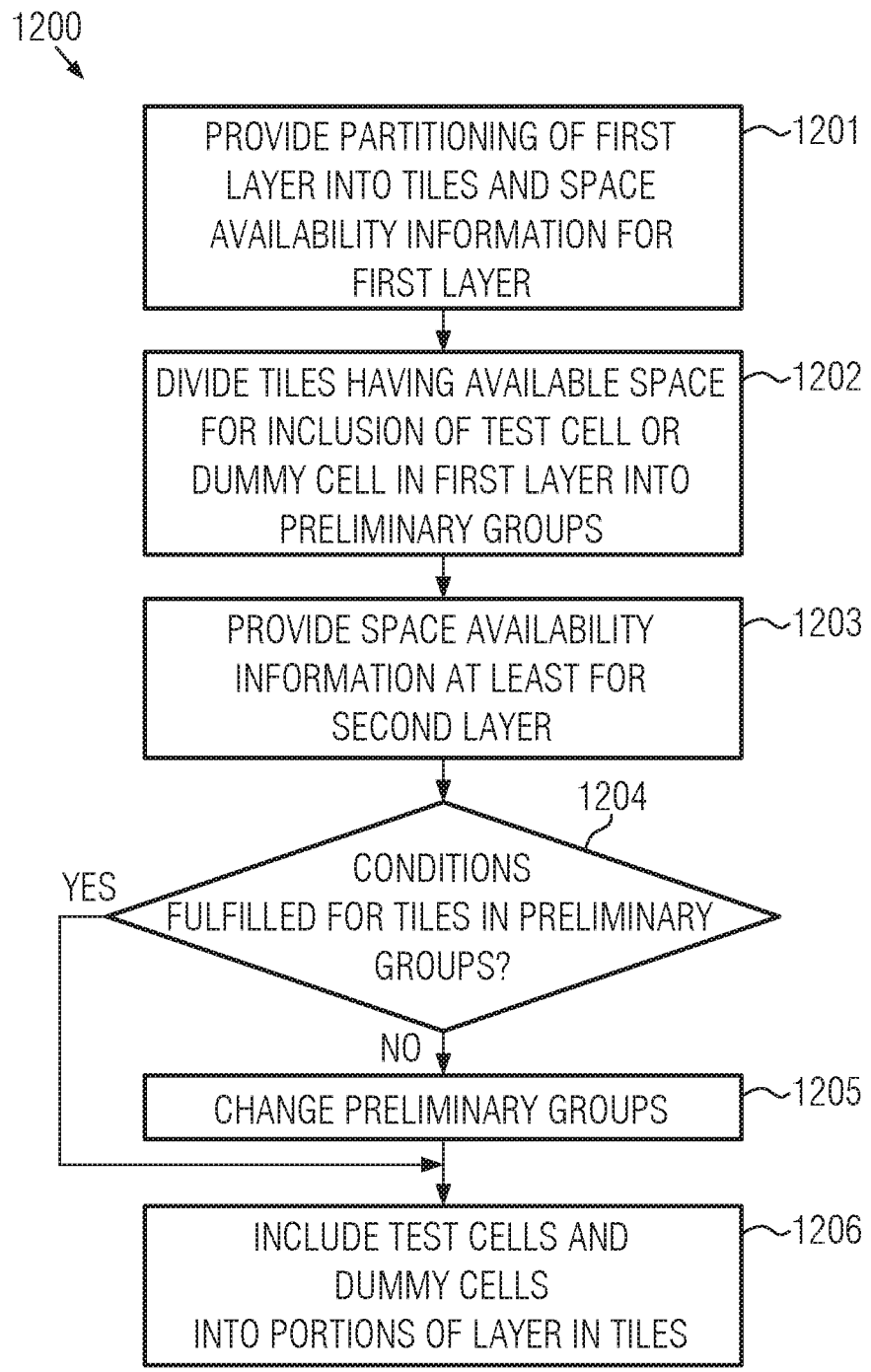

FIG. 12 shows a schematic flow diagram 1200 of a method that may be used for including test cells and dummy cells into the layout of the integrated circuit. The method illustrated by the flow diagram 1200 may be used for including test cells and dummy cells into the active layer 312 and the poly layer 313 (FIG. 3) of the integrated circuit. Similar techniques may also be used for including test cells and dummy cells into other layers of the integrated circuit, for example, into the via-zero layer 315 and the metal-one layer 316. In the following, description will be made first in the context of an application of the method illustrated by the flow diagram 1200 for an inclusion of test cells and dummy cells into the active layer 312 and the poly layer 313. Thereafter, applications to the via-zero layer 315, the metal-one layer 316 and the via-one layer 317 will be described.

At 1201, a partitioning of a first layer of an integrated circuit into tiles and space availability information for the first layer may be provided. In some embodiments, the first layer may be active layer 312. The partitioning of the first layer into tiles, and space availability information for the first layer may be provided in the form of tile number values N, M that define a partitioning of the first layer of the integrated circuit into an array of tiles, such as the array 425 of tiles described above with reference to FIG. 4, and in the form of a matrix, such as the matrix 500 described above with reference to FIG. 5. While, in some embodiments, the tile number values N, M may be included into data of the matrix 500, in other embodiments, the tile number values may be provided in the form of separate data. For providing the partitioning and the space availability information, techniques as described above with reference to FIGS. 4, 5 and 11 may be used.

At 1202, those tiles in the array 425 of tiles that have an available space for inclusion of a test cell or dummy cell in the first layer may be divided into preliminary groups. In some embodiments, the preliminary groups may be approximately uniformly distributed over the die area 205 of the integrated circuit.

In some embodiments, those of the tiles that have an available space for inclusion of a test cell or a dummy cell in the first layer may be included into the preliminary groups on the basis of the row and the column wherein the tile is located. For example, in some embodiments, in each of the rows 407 to 424 of the array 425 of tiles, the tiles in the row may be alternatingly assigned to a first preliminary group and a second preliminary group.

For example, for the row 407 of the array 425 of tiles, the tiles in columns 401, 403 and 405 may be assigned to preliminary group A, and the tiles in columns 402, 404 and 406 may be assigned to preliminary group B. Then, those of the tiles in the row 407 wherein the corresponding element of the matrix 500 has a value of 1 that indicates that the tile has an available space for inclusion of a test cell or a dummy cell may be included into preliminary group A or preliminary group B, in accordance with the preliminary group to which the respective tile is assigned.

In other rows of the array 425 of tiles, such as, for example, the row 408, the same assignment of tiles to preliminary groups as in row 407 may be used, wherein for other rows, for example, for the rows 409, 410, a different assignment of the tiles in the row to the preliminary groups may be used. For example, the tiles in columns 401, 403 and 405 may be assigned to preliminary group B, and the tiles in columns 402, 404 and 406 may be assigned to preliminary group A. Those of the tiles in the rows 409, 410 for which the corresponding element of the matrix 500 has a value of 1 may be included into the preliminary groups A and B in accordance with the assignments of the tiles to the preliminary groups. For example, for the row 409, the tiles in columns 402, 404 and 406 may be included into preliminary group A, and the tiles in columns 403 and 405 may be included into preliminary group B. The tile 429 in row 409 and column 401 does not have an available space for inclusion of a test cell and a dummy cell, as indicated by the value 0 of the corresponding element of the matrix 500. Accordingly, the tile 429 is not included into any of the preliminary groups.

For other rows of the array 425 of tiles, similar assignments of tiles to preliminary groups may be employed. For example, an assignment of tiles to preliminary groups as described above for rows 407 and 408, and an assignment of tiles to preliminary groups as described above for rows 409 and 410 may be alternatingly applied to pairs of rows of the array 425 of tiles. For example, for rows 411, 412, 415, 416, 419, 420, 423 and 424, an assignment of tiles to preliminary groups as described above for rows 407, 408 may be used, and for rows 413, 414, 417, 418, 421 and 422, an assignment of tiles to preliminary groups as described above for rows 409 and 410 may be used.

At 1203, space availability information may be provided at least for a second layer. For including test cells and dummy cells into the active layer 312 and the poly layer 313, the second layer may be the poly layer 313. The space availability information for the second layer indicates, for at least a part of the plurality of tiles of the array 425 of tiles, if space for inclusion of a test cell or a dummy cell is available in a portion of the second layer in the tile.

In some embodiments, the space availability information for the second layer may be provided in the form of a matrix similar to the matrix 500 described above with reference to FIG. 5, wherein the number of columns and the number of rows of the matrix are equal to the number of columns and the number of rows, respectively, of the array 425 of tiles. The elements of the matrix providing the space availability information for the second layer have values that are indicative of the availability of space for inclusion of a test cell or a dummy cell in portions of the second layer in the tiles of the array 425 of tiles.

The availability of space for inclusion of test cells or dummy cells in the second layer may be different from the availability of space for inclusion of test cells or dummy cells in the first layer. Therefore, the matrix providing the space availability information for the second layer may include elements having different values than corresponding elements in the same row and column of the matrix providing the space availability information for the first layer. For example, in embodiments wherein the first layer is the active layer 312 and the second layer is the poly layer 313, there may be tiles wherein there is an available space for inclusion of a test cell or a dummy cell in the active layer but wherein there is no space for inclusion of a test cell or a dummy cell in the poly layer 313.

The space availability information for the second layer may be provided by means of methods similar to those described above with reference to FIG. 11, wherein, at 1102, the second layer of the integrated circuit is selected, at 1103, the tile number values N, M that were obtained for the first layer are provided, and wherein the determination if one or more space availability criteria are fulfilled at 1110 and 1111, the changing of tile number values if at least one of the space availability criteria is not fulfilled at 1112, and the subsequent iteration of steps 1104 to 1109 are omitted. Thus, the space availability information for the second layer is provided on the basis of the same tile number values as the space availability information for the first layer.

At 1204, it may be determined if one or more conditions associated with the preliminary groups are fulfilled for the tiles in the preliminary groups. The conditions may be provided on the basis of constraints for the inclusion of test cells at locations close to each other in the first layer and in the second layer.

As described above, there may be difficulties in performing measurements when a test cell in the active layer 312 and a test cell in the poly layer 313 are located close to each other, and it may be of advantage to include dummy cells into available spaces for the inclusion of test cells or dummy cells in the active layer 312, when no test cells are included into these available spaces. In such embodiments, the preliminary groups of tiles may be used for providing a group A of tiles, wherein test cells are included into available spaces for the inclusion of test cells or dummy cells in the active layer 312, and a group B of tiles, wherein dummy cells are included into available spaces for the inclusion of test cells or dummy cells in the active layer 312, and test cells are included into available spaces for the inclusion of test cells or dummy cells in the poly layer 313.

In such embodiments, a condition may be provided for tiles in group B that is fulfilled if the space availability information for the poly layer 313 (being the second layer) indicates that space for inclusion of a test cell or dummy cell is available in the portion of the poly layer 313 in the tile, and which is not fulfilled if no space for inclusion of a test cell or a poly cell is available in the portion of the poly layer 313 in the tile. For tiles in preliminary group A, no such condition needs to be provided since an inclusion of test cells into tiles in the active layer 312 is possible also when there is no available space for inclusion of a test cell or a dummy cell in the same tile in the poly layer.

At 1205, if there are one or more tiles for which the condition for the preliminary group of tiles wherein the respective tile is located is not fulfilled, the preliminary groups of tiles may be changed so that the conditions for the tiles in the changed preliminary groups are fulfilled. In the inclusion of test cells and dummy cells into the active layer 312 and the poly layer 313, there may be tiles in preliminary group B wherein there is no available space for inclusion of a test cell or a dummy cell in the poly layer. For bringing the preliminary groups of tiles into conformity with the conditions for the tiles in the preliminary groups, such tiles may be moved from group B to group A. If, at 1204, it was determined that the conditions are fulfilled for all tiles in the preliminary groups, or the conditions for the preliminary groups are fulfilled after the changing of the preliminary groups at 1205, the preliminary groups may be maintained as the final groups of tiles.

At 1206, test cells and dummy cells may be included into portions of the first and second layer of the integrated circuit in the tiles. In the inclusion of test cells and dummy cells into the active layer 312 and the poly layer 313, a test cell may be included into available spaces for inclusion of a test cell or a dummy cell in the active layer 312 in tiles of group A, and a dummy cell may be included into available spaces for inclusion of a test cell or a dummy cell in the active layer 312 in tiles of group B. Furthermore, test cells may be included into available spaces for the inclusion of test cells or dummy cells in the poly layer 313 that are located in tiles of group B. In available spaces for the inclusion of test cells or dummy cells in the poly layer 313 that are located in tiles of group A, neither a test cell nor a dummy cell needs to be inserted.

If there are tiles that have more than one available space for inclusion of a test cell or a dummy cell, in some embodiments, the available space that is closest to the center of the tile may be used for the inclusion of a test cell or dummy cell.

Figure 7:
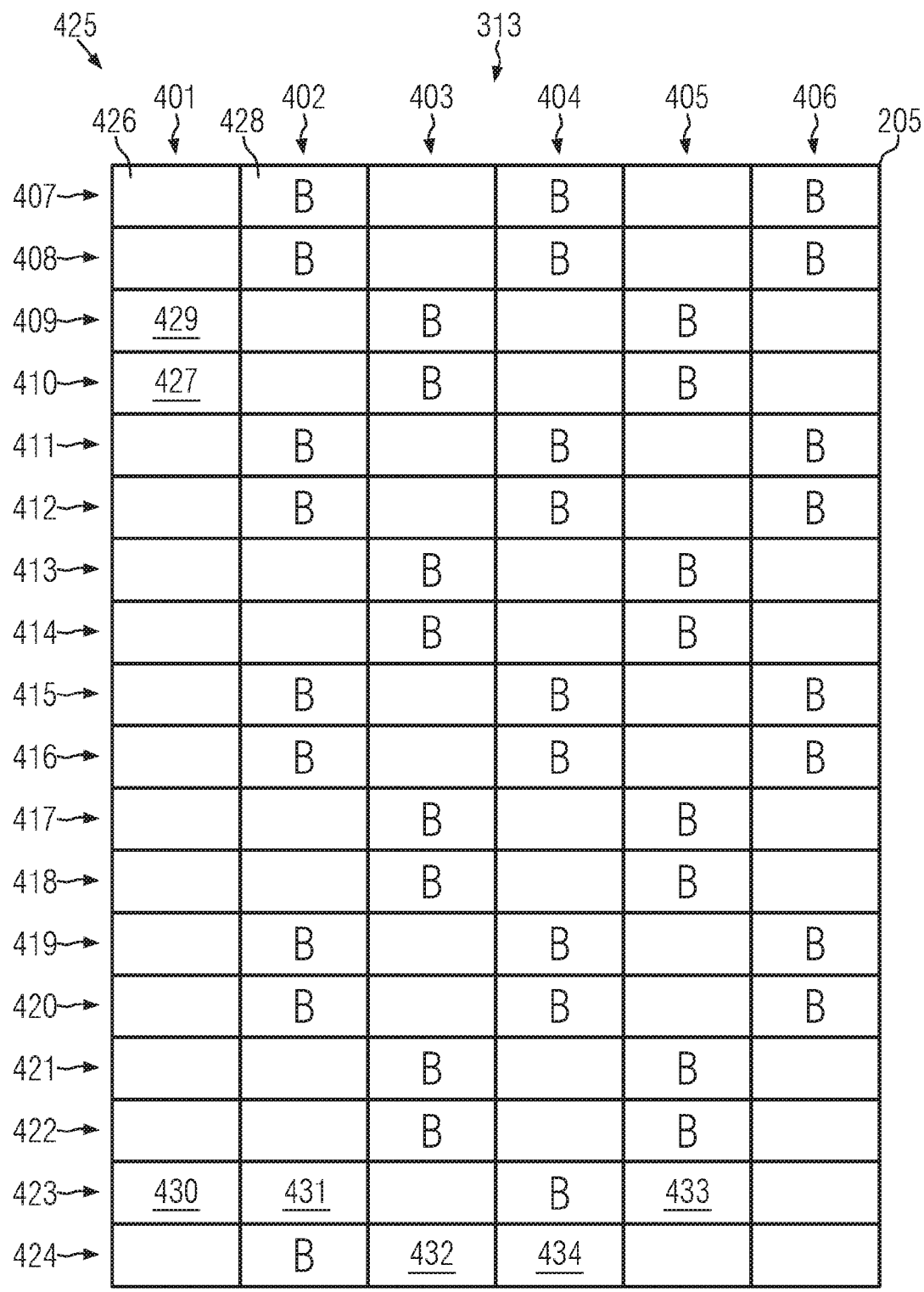

FIGS. 6 and 7 schematically illustrate the inclusion of test cells and dummy cells into the active layer 312 and a poly layer 313 in the integrated circuit provided in the die area 205. Each of FIGS. 6 and 7 show the partitioning of the die area 205 into the array 425 of tiles that was described above with reference to FIG. 4. FIG. 6 shows the active layer 312, illustrating the division of those tiles of the array 425 of tiles that have an available space for inclusion of a test cell or a dummy cell into groups A and B, wherein test cells are included into available spaces for the inclusion of test cells or dummy cells in tiles of group A, and dummy cells are included into available spaces for the inclusion of test cells or dummy cells in tiles of group B. FIG. 7 schematically illustrates the poly layer 313, wherein test cells are included into available spaces for the inclusion of test cells or dummy cells in tiles of group B. Since neither test cells nor dummy cells are included into tiles of group A in the poly layer 313, in FIG. 7, only the tiles of group B are shown.

In the example illustrated in FIGS. 6 and 7, the availability of spaces for the inclusion of test cells or dummy cells in the active layer 312 is as described above with reference to FIGS. 4 and 5. In the poly layer 313, the availability of spaces for inclusion of test cells and dummy cells is different from that in the active layer 312, since no available space for the inclusion of test cells or dummy cells is available in the tiles of column 401. In columns 402, 403, 404, 405 and 406, in the illustrative example, the availability of space for the inclusion of test cells and dummy cells in the poly layer corresponds to the availability of spaces for the inclusion of test cells or dummy cells in the active layer. Accordingly, as can be seen in FIGS. 6 and 7, the division of the tiles having an available space for inclusion of a test cell or a dummy cell in columns 402 to 406 corresponds to the division of the tiles into preliminary groups A and B at 1202 described above with reference to FIG. 12, whereas those tiles in column 401 that were in preliminary group B have been moved into group A. For example, tile 427, having an available space for inclusion of a test cell or a dummy cell in the active layer 312 but no available space for inclusion of a test cell or a dummy cell in the poly layer 313 was moved from preliminary group B and to final group A.

In some embodiments, for including test cells and dummy cells into the via-zero layer 315, the metal-one layer 316 and the via-one layer 317, methods similar to those described above may be employed, as will be described in the following with reference to FIG. 12.

As described above, there may be constraints for the inclusion of test cells into the via-zero layer 315 and into the via-one layer 317, since measurements performed at test cells in the via-zero layer 315 and test cells in the via-one layer 317 may be adversely affected when test cells in the via-zero layer 315 and the via-one layer 317 are close to each other, for example on top of each other, and/or for providing open circuits wherein there is no electrical connection between test cells in FEOL layers and BEOL layers of the integrated circuit. Moreover, it may be of advantage to include dummy cells into available spaces for the inclusion of test cells and dummy cells in the metal-one layer 316 when test cells are provided in the via-zero layer 315 and no test cells are included into available spaces for the inclusion of test cells or dummy cells in the via-one layer 317.

When performing a method as illustrated by the flow diagram 1200 of FIG. 12 for the inclusion of test cells and dummy cells in the via-zero layer 315, the metal-one layer 316 and the via-one layer 317, the metal-one layer 316 may be used as the first layer. Accordingly, at 1201, a partitioning of the metal-one layer 316 into tiles and space availability information for the metal-one layer 316 may be provided.

In some embodiments, this may be done using techniques as described above with reference to FIG. 11 wherein, at 1100, the metal-one layer 316 of the integrated circuit is selected, and wherein the tile number values N, M are changed at 1112, if necessary for fulfilling space availability criteria.

In other embodiments, at 1103, tile number values such as the number N of columns of the array 425 of tiles and the number M of the number of rows of the array 425 of tiles that were obtained for another layer of the integrated circuit, such as, for example, the active layer 312, may be provided at 1103, and these tile number values may be maintained, without changing the tile number values at 1112 and iterating steps 1104 to 1109. Thus, a partitioning of the metal-one layer 316 into a plurality of tiles that corresponds to the partitioning of the active layer may be provided.

The availability of space for inclusion of one of a test cell and a dummy cell into portions of the metal-one layer 316 in the tiles of the partitioning of the die area 205 provided for the active layer 312 may be different from the availability of space for inclusion of test cells and dummy cells in the active layer 312, although, in some embodiments, the pattern of available spaces in the active layer 312 and in the metal-one layer 316 may have a certain degree of similarity. For example, in the metal-one layer 316, an available space for the inclusion of a test cell or a dummy cell may be present in tiles 429, 430, 431, 432 and 433, wherein no space for inclusion of a test cell or a dummy cell is available in the active layer 312. For other tiles of the array 425 of tiles, for example for tiles 427, 428 and 434, and other tiles of the array 425 of tiles, the availability for space for inclusion of a test cell or a dummy cell in the metal-one layer 316 may substantially correspond to the availability of space for inclusion of a test cell or a dummy cell in the active layer 312.

In the division of tiles having an available space for inclusion of a test cell or dummy cell in the metal-one layer 316 into preliminary groups that is performed at 1202, in some embodiments, preliminary groups A and B may be provided using techniques as described above for the active layer 312.

In other embodiments, at 1202, the tiles having an available space for inclusion of a test cell or a dummy cell in the metal-one layer 316 may be divided into preliminary groups on the basis of a division of tiles into groups of tiles provided for another layer. For example, tiles that were included into a group A in the inclusion of test cells and dummy cells into the active layer 312 and the poly layer 313, and have an available space for an inclusion of a test cell or a dummy cell in the metal-one layer 316, may be preliminarily included into group A. Tiles that were included into group B in the inclusion of test cells and dummy cells into the active layer 312 and the poly layer 313, and have an available space for an inclusion of a test cell or a dummy cell in the metal-one layer 316, may be preliminarily included into group B. Tiles that have an available space for inclusion of a test cell or a dummy cell in the metal-one layer 316, and were not included into any group of tiles in the inclusion of test cells and dummy cells into the active layer 312 and the poly layer 313, may be preliminarily included into a third group C.

At 1203, space availability information may be provided for the via-zero layer 315 and the via-one layer 317. Similar to the provision of space availability information for the poly layer 313 described above, this may be done by performing a method similar to the method illustrated by the flow diagram 1100 in FIG. 11, wherein the determination if one or more space availability criteria are fulfilled at 1110 and 1111, the changing of tile number values at 1112, and the subsequent iterations of the steps performed at 1104 to 1109 are omitted, for each of the via-zero layer 315 and the via-one layer 317. The space availability information for the via-zero layer 315 may be provided in the form of a matrix similar to the matrix 500 shown in FIG. 5, wherein each element of the matrix has a value that indicates if a space for inclusion of a test cell or a dummy cell is available in a portion of the via-zero layer 315 in the corresponding tile. The space availability information for the via-one layer 317 may be provided in the form of another matrix, wherein each element of the matrix has a value that indicates if the portion of the via-one layer 317 in the corresponding tile has an available space for inclusion of a test cell or a dummy cell.

At 1204, it may be determined for the preliminary groups if the tiles in the preliminary group fulfill a condition associated with the respective preliminary group. For example, for each of the tiles in preliminary groups A and B, it may be determined if there is an available space for an inclusion of a test cell or a dummy cell in the portion of the via-zero layer 315 in the tile and if there is an available space for inclusion of a test cell or a dummy cell in the portion of the via-one layer 317 in the tile. For each of the tiles in preliminary group C, it may be determined if there is an available space for inclusion of a test cell or a dummy cell in the via-one layer 317.

If the conditions are fulfilled, the preliminary groups A, B and C may be maintained as final groups. If one or more tiles are in a preliminary group wherein there is a condition for the preliminary group that is not fulfilled for the tile, at 1205, the preliminary groups may be changed by moving such tiles into another group. For example, if there is a tile that was preliminarily assigned to group A or group B, and it is determined at 1204 that the portion of the via-zero layer 315 in the tile does not have an available space for inclusion of a test cell or a dummy cell, the tile may be moved to group C.

Typically, at least for sizes of test cells and dummy cells of less than 4.5×4.5 μm, for each of at least groups A and B, there is one tile that fulfils the conditions associated with the group. If this should not be the case, in some embodiments, the frame area 215 of the intra-filed area 203 may be used for including test cells and/or dummy cells, wherein techniques similar to those described herein may be used.

At 1206, test cells and dummy cells may be included into the via-zero layer 315, the metal-one layer 316 and the via-one layer 317 on the basis of the division of the tiles into groups A, B, C.

For tiles in group B, test cells may be included into the available spaces in the via-zero layer 315, dummy cells may be included into the available spaces in the metal-one layer 316, and neither test cells nor dummy cells are included into the available spaces in the via-one layer 317. For tiles in group C, test cells may be included both into available spaces in the metal-one layer 316 and in the via-one layer 317. Portions of the via-zero layer in tiles of group C need not have an available space for inclusion of a test cell and a dummy cell, and no test cells or dummy cells need to be included into portions of the via-zero layer in tiles of group C.

In some embodiments, for tiles in group A, test cells may be included into available spaces in portions of the metal-one layer 316 and the via-one layer 317 in the tiles, and neither test cells nor dummy cells need to be included into portions of the via-zero layer 315 in tiles of group A.

Figure 9:
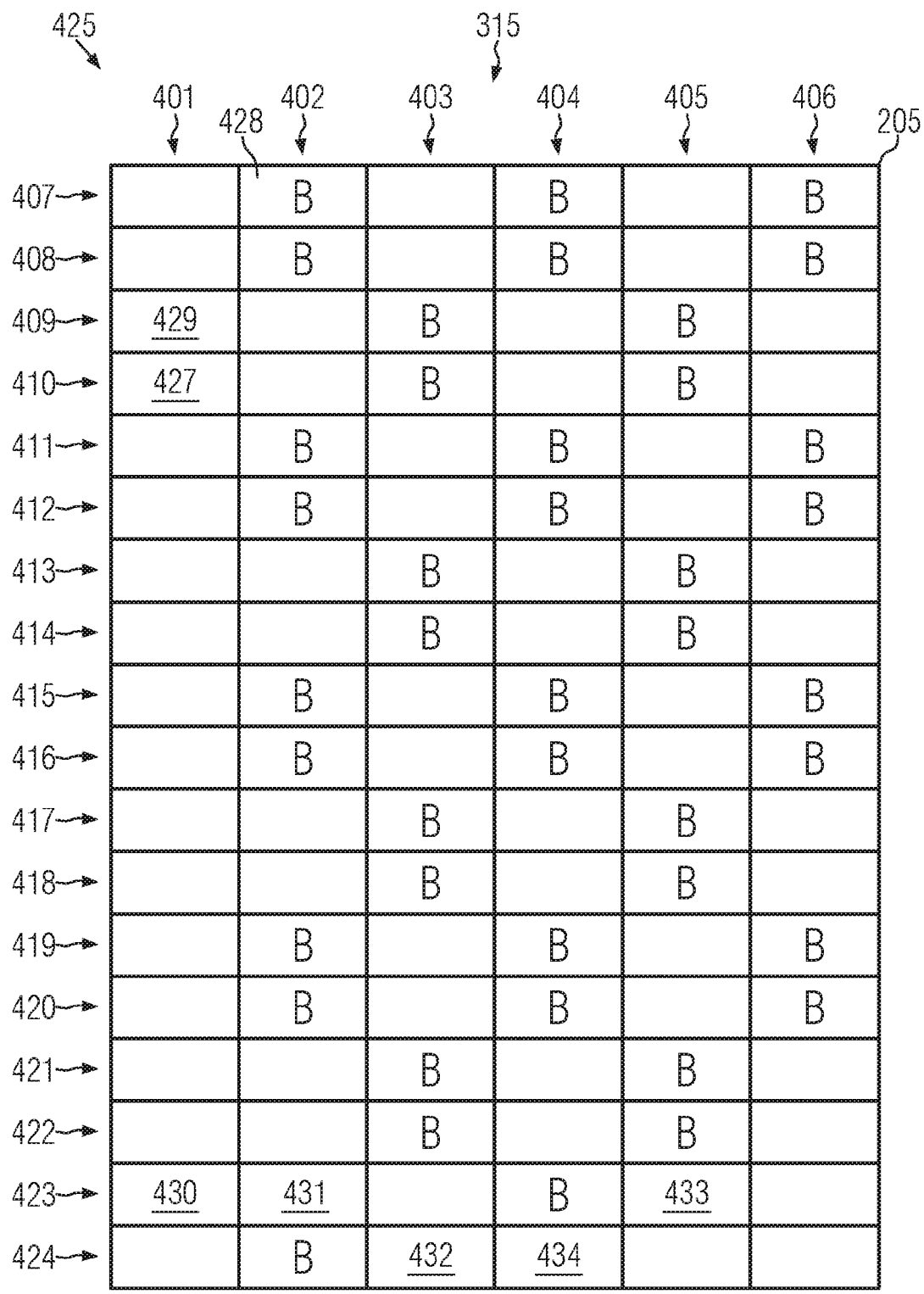
Figure 10:
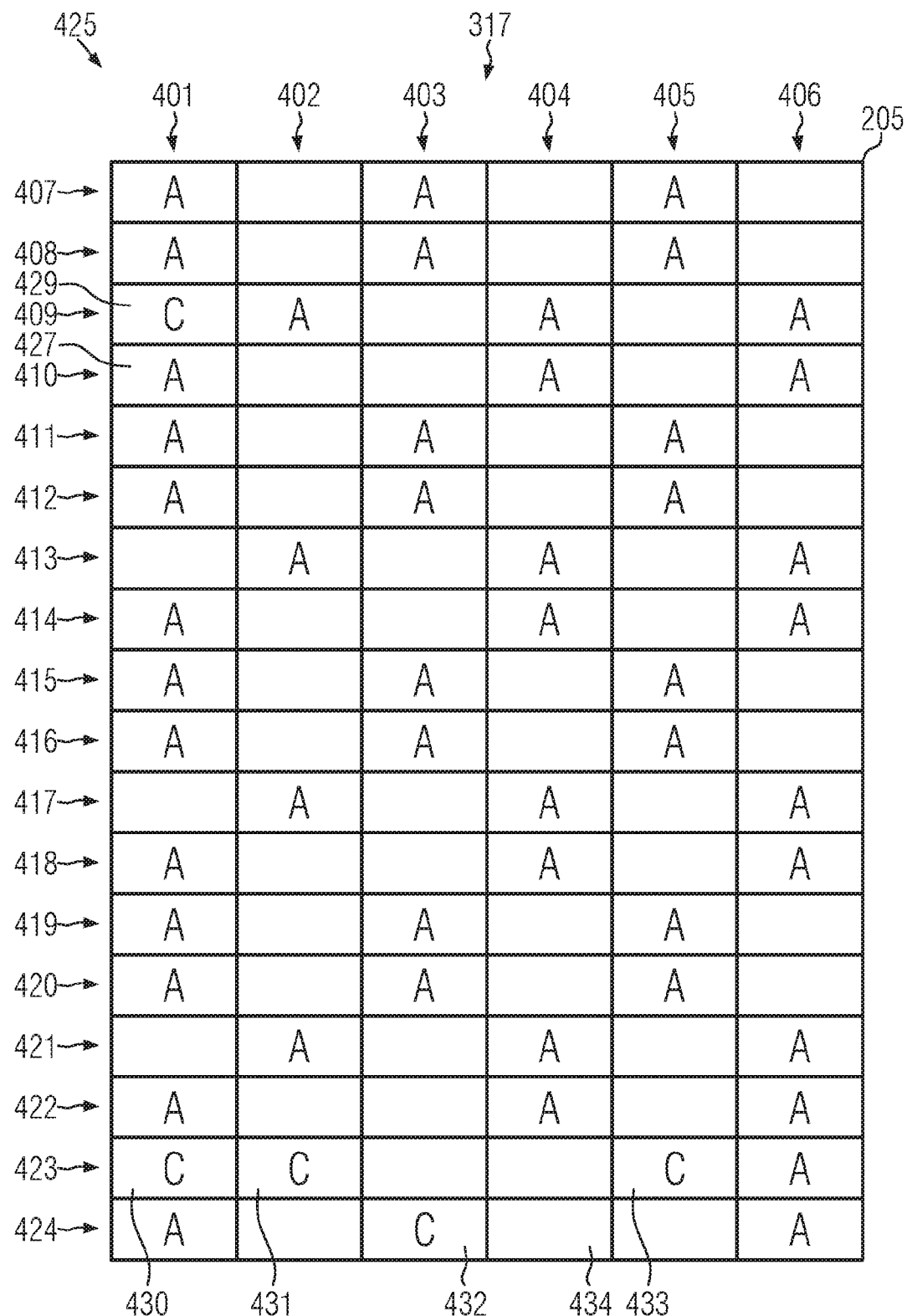

The inclusion of test cells and dummy cells into available spaces for the inclusion of test cells in portions of the via-zero layer 315, the metal-one layer 316 and the via-one layer 317 in such embodiments is schematically illustrated in FIGS. 8, 9 and 10.

FIG. 8 illustrates the inclusion of test cells and dummy cells into available spaces for the inclusion of test cells or dummy cells in the metal-one layer 316 in an embodiment wherein the partitioning of the die area 205 into tiles for the metal-one layer 316 corresponds to the partitioning of the die area 205 into tiles that is used for the inclusion of test cells and dummy cells into the active layer 312 and in the poly layer 313, and wherein the division of the tiles into groups for the inclusion of test cells and dummy cells for the metal-one layer 316, the via-zero layer 315 and the via-one layer 317 is based on the division of the tiles into groups A and B that was performed for the inclusion of test cells and dummy cells into the active layer 312 and the poly layer 313.

Thus, tiles that are in group A or group B in FIG. 6 are in the same group in FIG. 8. In particular, since in the illustrative example shown in FIGS. 6, 7, 8, 9 and 10, there is no available space for the inclusion of a test cell or a dummy cell in the poly layer for tiles in the column 401 of the array 425 of tiles, there are no tiles of group B in column 401.

Tiles 429, 430, 431, 432 and 433 do not include an available space for inclusion of a test cell or a dummy cell in any of the active layer 312, the poly layer 313, the contact layer 314 or the via-zero layer 315, but they include an available space for inclusion of a test cell or a dummy cell in the metal-one layer 316 and the via-one layer 317. Accordingly, tiles 429, 430, 431, 432 and 433 are in group C. Into available spaces for the inclusion of test cells or dummy cells in tiles that have been denoted by A or C in FIG. 8, test cells are included. Into available spaces for the inclusion of test cells or dummy cells in tiles that have been denoted by B, dummy cells are included.

FIG. 9 schematically illustrates the via-zero layer 315. Into available spaces for the inclusion of test cells or dummy cells in the via-zero layer 315 that are in tiles denoted by letter B in FIG. 9, test cells are included. Neither a test cell nor a dummy cell is included into available spaces for the inclusion of test cells or dummy cells in the other tiles.

FIG. 10 schematically shows the via-one layer 317. Test cells are included into available spaces for the inclusion of test cells or dummy cells in tiles that are denoted by letters A and C. Neither test cells nor dummy cells are included into the other tiles of the array 425 of tiles.

By including test cells and dummy cells into the via-zero layer 315, the metal-one layer 316 and the via-one layer 317 in accordance with the division of tiles into groups A, B and C as described above, it may be ensured that constraints concerning the placement of test cells in the via-zero layer 315 and the via-one layer 317 as described above are fulfilled, and dummy cells are included as necessary.

The inclusion of test cells into layers of the integrated circuit other than the active layer 312, the poly layer 313, the via-zero layer 315, the metal-one layer 316 and the via-one layer 317 need not be subject to constraints as described above. Accordingly, test cells may be included into available spaces for the inclusion of test cells or dummy cells in each of these layers.

The inclusion of test cells and dummy cells as described above is further illustrated in the following Table 1.

TABLE 1

| layer | group | | | |
|---|---|---|---|---|
| | A | B | C | others |
| active | T | D | | |
| poly | | T | | |
| contact | T | T | | |
| via-zero | X | T | | |
| metal-one | T | D | T | |
| via-one | T | X | T | |
| metal-two and higher metal and via layers | T | T | T | T |

In the table, the columns denote groups of tiles, and the rows denote the layers of the integrated circuit. An inclusion of test cells into available spaces for the inclusion of test cells or dummy cells is denoted by letter "T," an inclusion of dummy cells into available spaces for the inclusion of test cells or dummy cells is denoted by letter "D," and an inclusion of neither a test cell nor a dummy cell is denoted by letter "X." In addition to columns for groups A, B and C as described above, the table includes a column denoted "others" and denotes tiles wherein the second metal layer, the second via layer and higher metal and via layers include an available space for inclusion of a test cell or a dummy cell, and wherein no available spaces are available in any of the lower layers.

By including neither test cells nor dummy cells into portions of the via-zero layer in tiles of group A and including neither test cells nor dummy cells into portions of the via-one layer in tiles of group B, an open circuit may be provided wherein there is no electrical connection between test cells in FEOL layers and test cells in BEOL layers.

In other embodiments, the inclusion of test cells and dummy cells into the via-zero layer 315, the metal-one layer 316 and the via-one layer 317 may be performed as illustrated in the following Table 2.

TABLE 2

| | group | | | |
|---|---|---|---|---|
| layer | A | B | C | others |
| active | T | D | | |
| poly | | T | | |
| contact | T | T | | |
| via-zero | T | T | | |
| metal-one | D | D | T | |
| via-one | X | X | T | |
| metal-two and higher metal and via layers | T | T | T | T |

In such embodiments, for each of the tiles in group A, test cells are included into available spaces for the inclusion of test cells and dummy cells in the via-zero layer 315, dummy cells are included into available spaces for the inclusion of test cells or dummy cells in the metal-one layer 316, and neither test cells nor dummy cells are included into available spaces for the inclusion of test cells or dummy cells in the via-one layer 317.

By including neither test cells nor dummy cells into portions of the via-zero layer in tiles of groups A and B, an open circuit may be provided wherein there is no electrical connection between test cells in FEOL layers and test cells in BEOL layers. In further embodiments, the availability of spaces for inclusion of test cells and dummy cells in the layers of the integrated circuit, which is provided by the layout of the integrated circuit, may be different from the embodiments described above. For example, in some embodiments, there may be tiles of the partitioning of the die area of the integrated circuit into tiles wherein there is an available space for inclusion of a test cell or a dummy cell in the poly layer 313 and in the contact layer 314, but wherein there is no space for inclusion of a test cell or a dummy cell in the active layer 312. In some embodiments, such tiles may be included into a group C of tiles. Furthermore, there may be tiles wherein the via-zero layer 315 has available spaces for the inclusion of test cells or dummy cells, and the active layer 312, the poly layer 313 and the contact layer 314 do not have available spaces for the inclusion of test cells or dummy cells. Such tiles may be included into a group D of tiles.

In such embodiments, the inclusion of test cells and dummy cells into the via-zero layer 315, the metal-one layer 316 and the via-one layer 317 may be performed in accordance with the following Table 3.

TABLE 3

| | group | | | | |
|---|---|---|---|---|---|
| layer | A | B | C | D | others |
| active | T | D | | | |
| poly | | T | T | | |
| contact | T | T | T | | |
| via-zero | X | T | X | X | |
| metal-one | T | D | T | T | |
| via-one | T | X | T | T | |
| metal-two and higher metal and via layers | T | T | T | T | |

As shown in Table 3, for tiles in group B, test cells may be included into available spaces for the inclusion of test cells or dummy cells in the via-zero layer 315, dummy cells may be included into available spaces for the inclusion of test cells or dummy cells in the metal-one layer 316, and neither test cells nor dummy cells are included into available spaces for the inclusion of test cells or dummy cells in the via one layer 317. For tiles in groups A, C and D, test cells are included into available spaces for the inclusion of test cells or dummy cells in the metal-one layer 316 and the via layer 317, and neither test cells nor dummy cells are included into available spaces for the inclusion of test cells or dummy cells in the via-zero layer 315. In such embodiments, the via-zero layer 315, which has more available locations than the active layer 312 and the poly layer 313, has only one group B wherein test cells are included.

By including neither test cells nor dummy cells into portions of the via-zero layer in tiles of groups A, C and D, and including neither test cells nor dummy cells into portions of the via-one layer in tiles of group B, an open circuit may be provided wherein there is no electrical connection between test cells in FEOL layers and test cells in BEOL layers.

Alternatively, the inclusion of test cells and dummy cells may be performed in accordance with the following Table 4.

TABLE 4

| | group | | | | |
|---|---|---|---|---|---|
| layer | A | B | C | D | others |
| active | T | D | | | |
| poly | | T | T | | |
| contact | T | T | T | | |
| via-zero | T | T | X | X | |
| metal-one | D | D | T | T | |
| via-one | X | X | T | T | |
| metal-two and higher metal and via layers | T | T | T | T | |

In such embodiments, the inclusion of test cells and dummy cells into tiles in group A is performed in the same manner as the inclusion of test cells and dummy cells into tiles of group B. The inclusion of test cells and dummy cells into tiles in groups B, C and D is the same as described for Table 3. In such embodiments, the via-zero layer 315 has two groups A and B of tiles wherein test cells are included.

By including neither test cells nor dummy cells into portions of the via-zero layer in tiles of groups C and D, and including neither test cells nor dummy cells into portions of the via-one layer in tiles of groups A and B, an open circuit may be provided wherein there is no electrical connection between test cells in FEOL layers and test cells in BEOL layers.

For embodiments in accordance with Table 3 or Table 4, the assignment of tiles to groups A and B may be performed as described above. The assignment of tiles to groups C and D may be performed on the basis of space availability for the active layer 312, the poly layer 313, the contact layer 314 and/or the via-zero layer 315, which may be obtained at 1203 when performing the method illustrated by the flow diagram 1200 with the metal-one layer 316 as the first layer.

After an inclusion of test cells and dummy cells into the layout of an integrated circuit as described above, the layout of the integrated circuit including the test cells and dummy cells may be output for reticle formation, similar to the outputting of the layout for reticle formation at 106 in the method illustrated by the flow diagram 100 of FIG. 1 and/or for performing further processing steps at the layout. In particular, in embodiments wherein techniques as described herein are performed before optical proximity correction is performed and/or sub-resolution assist features are inserted, after the inclusion of test cells and dummy cells into the layout of the integrated circuit using techniques as described herein, optical proximity correction may be performed and/or sub-resolution assist features may be inserted, similar to the acts performed at 105 in the method illustrated by the flow diagram 100 shown in FIG. 1.

Techniques as described herein may be performed by means of a computer. For this purpose, code for causing the computer to perform methods as described herein may be provided to the computer by means of a storage medium such as, for example, an optical storage device such as a CD or a DVD, a solid state storage medium such as a flash memory device and/or a hard disk. In other embodiments, the code may be provided to the computer by means of a network connection.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed:

1. A method, comprising:
    receiving a layout of an integrated circuit comprising a plurality of layers;
    selecting one of said plurality of layers of said integrated circuit;
    providing one or more tile number values;
    partitioning a die area of said integrated circuit into a plurality of tiles on the basis of said one or more tile number values;
    for each of said plurality of tiles, determining, on the basis of said layout, if a portion of said selected one of said plurality of layers of said integrated circuit in said tile comprises an available space for inclusion of one of a test cell and a dummy cell, and assigning a label indicative of a result of said determining to said tile;
    determining, on the basis of said labels assigned to said tiles, if one or more space availability criteria are fulfilled; and
    if said one or more space availability criteria are fulfilled, using said labels for including at least one of said one or more test cells and said one or more dummy cells into said layout.

2. The method of claim 1, further comprising:
    if said one or more space availability criteria are not fulfilled, changing at least one of said one or more tile number values, and iterating said partitioning of said die area of said integrated circuit into a plurality of tiles, said determining, for each of said plurality of tiles, if a portion of said selected one of said plurality of layers of said integrated circuit in said tile comprises an available space for inclusion of one of a test cell and a dummy cell, said assigning of labels indicative of a result of said determining to said tiles and said determining if one or more space availability criteria are fulfilled.

3. The method of claim 2, wherein said partitioning said die area into a plurality of tiles comprises partitioning said die area into an array of tiles, said array of tiles comprising a plurality of rows and a plurality of columns, each tile being arranged in one of said rows and one of said columns, said one or more tile number values comprising a number of said rows of said array and a number of said columns of said array, and wherein said changing at least one of said one or more tile number values comprises changing at least one of said number of rows of said array of tiles and said number of columns of said array of tiles.

4. The method of claim 3, further comprising:
    generating a matrix having a number of rows corresponding to the number of rows of said array of tiles and a number of columns corresponding to the number of columns of said array of tiles, said matrix having a plurality of elements, each element of said matrix being uniquely associated with a respective one of said tiles of said array of tiles and having a value corresponding to said one of said first value and said second value assigned to the respective one of said tiles of said array of tiles; and
    wherein said at least one of said one or more test cells and said one or more dummy cells are placed in said integrated circuit on the basis of said matrix.

5. The method of claim 1, wherein said partitioning said die area into a plurality of tiles comprises partitioning said die area into an array of tiles, said array of tiles comprising a plurality of rows and a plurality of columns, each tile being arranged in one of said rows and one of said columns, said one or more tile number values comprising a number of said rows of said array and a number of said columns of said array.

6. The method of claim 1, wherein said determining if a portion of said selected one of said plurality of layers of said integrated circuit in said tile comprises an available space for inclusion of one of said test cell and said dummy cell comprises determining, on the basis of said layer layout information, if said portion of said selected layer of said integrated circuit in said tile comprises a space without circuit features of said integrated circuit having a size equal to or greater than a size of said test cell and said dummy cell.

7. The method of claim 1, wherein said assigning of labels indicative of a result of said determining to said tile comprises:
    assigning a first value to said tile if said portion of said selected one of said plurality of layers of said integrated circuit in said tile comprises an available space for inclusion of at least one of said test cell and said dummy cell; and assigning a second value to said tile if said portion of said selected one of said plurality of layers of said integrated circuit in said tile does not comprise an available space for inclusion of at least one of said test cell and said dummy cell.

8. The method of claim 7, wherein said determining if one or more space availability criteria are fulfilled comprises:
determining if a first space availability criterion is fulfilled, wherein said first space availability criterion is fulfilled if a number of tiles having said first value assigned thereto is greater than a threshold number.

9. The method of claim 8, wherein said determining if one or more space availability criteria are fulfilled further comprises:
determining if a second space availability criterion is fulfilled, wherein said second space availability criterion is fulfilled if a ratio between said number of tiles having said first value assigned thereto and a total number of said tiles is greater than a threshold coverage.

10. A method, comprising:
receiving a layout of an integrated circuit comprising a plurality of layers;
selecting one of said plurality of layers of said integrated circuit;
providing one or more tile number values;
partitioning a die area of said integrated circuit into a plurality of tiles on the basis of said one or more tile number values, said array of tiles comprising a plurality of rows and a plurality of columns, each tile being arranged in one of said rows and one of said columns, said one or more tile number values comprising a number of said rows of said array and a number of said columns of said array;
for each of said plurality of tiles, determining, on the basis of said layout, if a portion of said selected one of said plurality of layers of said integrated circuit in said tile comprises an available space for inclusion of one of a test cell and a dummy cell by determining if said portion of said selected layer of said integrated circuit in said tile comprises a space without circuit features of said integrated circuit having a size equal to or greater than a size of said test cell and said dummy cell, and assigning a label indicative of a result of said determining to said tile;
determining, on the basis of said labels assigned to said tiles, if one or more space availability criteria are fulfilled; and
if said one or more space availability criteria are fulfilled, using said labels for including at least one of said one or more test cells and said one or more dummy cells into said layout.

11. The method of claim 10, further comprising:
if said one or more space availability criteria are not fulfilled, changing at least one of said one or more tile number values, and iterating said partitioning of said die area of said integrated circuit into a plurality of tiles, said determining, for each of said plurality of tiles, if a portion of said selected one of said plurality of layers of said integrated circuit in said tile comprises an available space for inclusion of one of a test cell and a dummy cell, said assigning of labels indicative of a result of said determining to said tiles and said determining if one or more space availability criteria are fulfilled.

12. The method of claim 11, wherein said changing at least one of said one or more tile number values comprises changing at least one of said number of rows of said array of tiles and said number of columns of said array of tiles.

13. The method of claim 12, further comprising:
generating a matrix having a number of rows corresponding to the number of rows of said array of tiles and a number of columns corresponding to the number of columns of said array of tiles, said matrix having a plurality of elements, each element of said matrix being uniquely associated with a respective one of said tiles of said array of tiles and having a value corresponding to said one of said first value and said second value assigned to the respective one of said tiles of said array of tiles; and
wherein said at least one of said one or more test cells and said one or more dummy cells are placed in said integrated circuit on the basis of said matrix.

14. The method of claim 10, wherein said assigning of labels indicative of a result of said determining to said tile comprises:
assigning a first value to said tile if said portion of said selected one of said plurality of layers of said integrated circuit in said tile comprises an available space for inclusion of at least one of said test cell and said dummy cell; and
assigning a second value to said tile if said portion of said selected one of said plurality of layers of said integrated circuit in said tile does not comprise an available space for inclusion of at least one of said test cell and said dummy cell.

15. The method of claim 10, wherein said determining if one or more space availability criteria are fulfilled comprises:
determining if a first space availability criterion is fulfilled, wherein said first space availability criterion is fulfilled if a number of tiles having said first value assigned thereto is greater than a threshold number.

16. The method of claim 15, wherein said determining if one or more space availability criteria are fulfilled further comprises:
determining if a second space availability criterion is fulfilled, wherein said second space availability criterion is fulfilled if a ratio between said number of tiles having said first value assigned thereto and a total number of said tiles is greater than a threshold coverage.

* * * * *